US008527340B2

(12) United States Patent
Fisher et al.

(10) Patent No.: US 8,527,340 B2
(45) Date of Patent: Sep. 3, 2013

(54) SYSTEMS AND METHODS FOR ANALYTIC DATA GATHERING FROM IMAGE PROVIDERS AT AN EVENT OR GEOGRAPHIC LOCATION

(71) Applicant: KBA2, Inc., Tiburon, CA (US)

(72) Inventors: Jon Fisher, Tiburon, CA (US); Jeff Broderick, Ross, CA (US); Douglas Van Blaricom, San Pablo, CA (US); Alex Malinovsky, Lafayette, CA (US); Anthony S. Wu, Richmond, CA (US)

(73) Assignee: KBA2, Inc., Tiburon, CA (US)

( * ) Notice: Subject to any disclaimer, the term of this patent is extended or adjusted under 35 U.S.C. 154(b) by 0 days.

(21) Appl. No.: 13/653,228

(22) Filed: Oct. 16, 2012

(65) Prior Publication Data

US 2013/0040660 A1       Feb. 14, 2013

Related U.S. Application Data

(63) Continuation of application No. 13/414,513, filed on Mar. 7, 2012.

(60) Provisional application No. 61/539,718, filed on Sep. 27, 2011, provisional application No. 61/495,335, filed on Jun. 9, 2011, provisional application No. 61/450,092, filed on Mar. 7, 2011.

(51) Int. Cl.
*G06Q 30/00* (2012.01)
*H04W 24/00* (2009.01)

(52) U.S. Cl.
USPC ... 705/14.4; 455/456.1; 705/14.5; 705/14.58; 705/14.64

(58) Field of Classification Search
USPC .................................. 705/14.54, 14.5, 14.64
See application file for complete search history.

(56) References Cited

U.S. PATENT DOCUMENTS

| 5,694,514 A | 12/1997 | Evans et al. ..................... 386/46 |
| 5,729,471 A | 3/1998 | Jain et al. ................... 364/514 A |
| 5,745,126 A | 4/1998 | Jain et al. ....................... 345/952 |
| 5,850,352 A | 12/1998 | Moezzi et al. ............ 364/514 A |

(Continued)

FOREIGN PATENT DOCUMENTS

| WO | WO 03041411 A1 | 5/2003 |
| WO | WO 2006046234 A2 | 5/2006 |

(Continued)

OTHER PUBLICATIONS

International Search Report and Written Opinion of the International Searching Authority, application No. PCT/US2012/028074, mailed Oct. 25, 2012.

*Primary Examiner* — Matthew T Sittner
(74) *Attorney, Agent, or Firm* — Winston & Strawn LLP

(57) ABSTRACT

The invention relates to a system and method of gathering and analyzing data from device operators aiming their image capture devices and thereby creating a line of sight to an object of interest, for example through the process of obtaining photographs, videos or other digital images of an event or geographical location, where the real-time or embedded location, compass heading, and time data from each of a plurality of image providers are communicated from the plurality of image-capture devices to one or more servers for statistical analysis of the proportionate amount of providers focusing on each image target or sub-target at the event or location.

9 Claims, 12 Drawing Sheets

(56) References Cited

U.S. PATENT DOCUMENTS

| | | | |
|---|---|---|---|
| 5,917,958 A | 6/1999 | Nunally et al. | 382/276 |
| 6,002,995 A | 12/1999 | Suzuki et al. | 702/188 |
| 6,591,068 B1 | 7/2003 | Dietz | 396/429 |
| 6,597,393 B2 | 7/2003 | Kato et al. | 348/211.99 |
| 6,680,746 B2 | 1/2004 | Kawai et al. | 348/211.9 |
| 6,809,760 B1 | 10/2004 | Takagi et al. | 348/211.9 |
| 6,891,566 B2 | 5/2005 | Marchese | 348/211.3 |
| 7,027,083 B2 | 4/2006 | Kanade et al. | 348/159 |
| 7,193,645 B1 | 3/2007 | Aagaard et al. | 348/211.3 |
| 7,196,722 B2 | 3/2007 | White et al. | 348/211.99 |
| 7,242,423 B2 | 7/2007 | Lin | 348/169 |
| 7,447,380 B2 | 11/2008 | Williams et al. | 382/284 |
| 7,448,063 B2 | 11/2008 | Freeman et al. | 725/136 |
| 7,460,150 B1 | 12/2008 | Coughlan et al. | |
| 7,472,134 B2 | 12/2008 | Kaku | 707/104.1 |
| 7,495,687 B2 | 2/2009 | DuMas et al. | 348/143 |
| 7,576,770 B2 | 8/2009 | Metzger et al. | 348/143 |
| 7,631,261 B2 | 12/2009 | Williams et al. | 715/720 |
| 7,746,380 B2 | 6/2010 | Maruya et al. | 348/169 |
| 7,836,093 B2 | 11/2010 | Gobeyn et al. | 707/802 |
| 7,840,130 B2 | 11/2010 | Kucharyson | 396/56 |
| 7,856,360 B2 | 12/2010 | Kramer et al. | 705/1.1 |
| 7,920,626 B2 | 4/2011 | Fernandez et al. | 375/240.16 |
| 7,956,892 B2 | 6/2011 | Frederick | 348/157 |
| 8,004,561 B2 | 8/2011 | Mottur et al. | 348/143 |
| 8,051,452 B2 | 11/2011 | Arseneau et al. | 725/74 |
| 8,115,812 B2 | 2/2012 | Yoshida et al. | 348/159 |
| 8,184,169 B2 | 5/2012 | Ortiz | 348/211.8 |
| 8,204,273 B2 | 6/2012 | Chambers et al. | 382/103 |
| 8,250,616 B2 | 8/2012 | Davis et al. | 725/87 |
| 8,311,279 B2 | 11/2012 | Quarfordt et al. | |
| 8,335,522 B2 | 12/2012 | Mate et al. | |
| 2002/0140745 A1* | 10/2002 | Ellenby et al. | 345/848 |
| 2003/0220835 A1 | 11/2003 | Barnes, Jr. | 705/14 |
| 2004/0075752 A1 | 4/2004 | Valleriano et al. | |
| 2004/0150715 A1 | 8/2004 | Wilcock et al. | |
| 2007/0146484 A1 | 6/2007 | Horton et al. | 348/159 |
| 2007/0162922 A1 | 7/2007 | Park | |
| 2007/0279494 A1 | 12/2007 | Aman et al. | 348/169 |
| 2008/0084473 A1* | 4/2008 | Romanowich | 348/135 |
| 2008/0294588 A1 | 11/2008 | Morris et al. | 706/47 |
| 2009/0012868 A1* | 1/2009 | DeAngelis | 705/14 |
| 2009/0015671 A1 | 1/2009 | Addy | 348/143 |
| 2009/0044235 A1 | 2/2009 | Davidson | 725/87 |
| 2009/0073265 A1 | 3/2009 | Greenhill et al. | 348/148 |
| 2009/0089162 A1 | 4/2009 | Davis et al. | 705/14 |
| 2009/0102859 A1* | 4/2009 | Athsani et al. | 345/619 |
| 2009/0113505 A1 | 4/2009 | Yu | 725/114 |
| 2009/0148124 A1 | 6/2009 | Athsani et al. | 386/46 |
| 2009/0219391 A1 | 9/2009 | McLeish et al. | 348/143 |
| 2009/0248607 A1 | 10/2009 | Eggink et al. | 706/54 |
| 2009/0319166 A1 | 12/2009 | Khosravy et al. | 701/200 |
| 2010/0030706 A1* | 2/2010 | Kannan et al. | 705/400 |
| 2010/0088159 A1 | 4/2010 | Henshaw et al. | 705/10 |
| 2010/0323716 A1* | 12/2010 | Jaffri | 455/456.1 |
| 2011/0107369 A1 | 5/2011 | O'Brien et al. | 725/38 |
| 2011/0117934 A1* | 5/2011 | Mate et al. | 455/456.3 |
| 2011/0122257 A1 | 5/2011 | Kirk | 348/187 |
| 2011/0142016 A1* | 6/2011 | Chatterjee | 370/338 |
| 2011/0187865 A1 | 8/2011 | Felt et al. | 348/159 |
| 2011/0191151 A1 | 8/2011 | Rosa | 705/14.1 |
| 2011/0199479 A1* | 8/2011 | Waldman | 348/116 |
| 2012/0011267 A1 | 1/2012 | Ma et al. | 709/231 |
| 2012/0059826 A1* | 3/2012 | Mate et al. | 707/737 |
| 2012/0066231 A1* | 3/2012 | Petersen et al. | 707/748 |
| 2012/0114307 A1 | 5/2012 | Yang et al. | 386/46 |
| 2012/0327194 A1 | 12/2012 | Shiratori et al. | |

FOREIGN PATENT DOCUMENTS

| | | |
|---|---|---|
| WO | WO 2008/076793 A2 | 6/2008 |
| WO | WO 2009/086153 A2 | 7/2009 |
| WO | WO 2011138672 A1 | 11/2011 |
| WO | WO 2012020510 A1 | 2/2012 |

* cited by examiner

SYSTEMS AND METHODS FOR ANALYTIC DATA GATHERING FROM IMAGE PROVIDERS AT AN EVENT OR GEOGRAPHIC LOCATION

FIELD OF THE INVENTION

The present invention relates to a system and method of gathering and analyzing data generated by image capture devices and collected from device operators aiming their image capture devices and thereby creating a line of sight to an object of interest, for example through the process of obtaining photographs, videos or other digital images of an event or location.

SUMMARY OF THE INVENTION

Embodiments of the present invention also relate to system for determining objects of interest at events or locations, which comprises a computer system running at least an application program capable of receiving the real time stream of data from the remote portable image capture devices and analyzing the data, and a database capable of storing at least some of the received data wherein the application program is configured to receive in the real time data stream from the portable image capture devices information from which the application program determines the geographic location and compass heading of the devices when the devices are using image capturing capabilities of their devices, calculates a location where a line of sight from each of the two or more devices could intersect to identify a potential object of interest, identifies from the calculation a cluster of users that are associated with the potential object of interest, and stores the cluster and its association with a particular object of interest.

Embodiments of the present invention also relate to a system that is geographically separated from the two or more devices, and wherein the devices are mobile telephonic devices.

Embodiments of the present invention also relate to where the real time data stream includes GPS coordinates and compass heading from the devices and the application program calculates the location of the object, area, or point of interest by triangulation using GPS coordinates and compass heading from the devices to determine distances and angles between the devices.

Embodiments of the present invention also relate to where the server system stores the location(s) of the potential objects of interest, and an algorithm of the application program analyzes the stored locations to determine to determine a dynamic state of the cluster, where the cluster can be an area in space where two or more lines of sight intersect.

Embodiments of the present invention also relate to where the server system transmits the location of a cluster or a rapid increase in the users within the cluster to a third party to alert them of its existence, so the third party can respond to the cluster.

Embodiments of the present invention also relate to computer implemented method for obtaining information from plurality of image capture devices which comprises receiving a continuous stream of data from each of a plurality of image capture devices, wherein the data steam comprises GPS position data, compass heading data, and time data, processing the data using a software application that determines locations where each electronic device was focused, determining the number of electronic devices focused on each location at approximately a same time from the processed data, identifying a cluster of users from the number of devices determined to be focused on a particular location, generating information representing an amount of interest or momentum of interest in each location by performing statistical calculations of a proportional number of electronic devices focused on each location at a specific time or period of time.

Additional embodiments of the present invention relate to storing the results of the statistical calculations for future decisions regarding which locations to target at certain times.

Other embodiments of the present invention relate to computer implemented method of determining the level of interest in an object at an event or location, which comprises receiving a real time stream of data at a computer system transmitted from one or more electronic devices, wherein the electronic devices are remote from the system, storing the data values comprising the data stream from each of the electronic devices on the system, wherein the data values comprise at least the UPS coordinates and the compass heading of the transmitting electronic device, determining a line of sight from each of the electronic devices based upon the GPS position and compass heading, determining the distance and direction between a pair of electronic devices, calculating the point of intersection of the lines of sight for the pair of electronic devices through triangulation, repeating the determination of the distance and direction for each possible pair of electronic devices and the calculations of the points of intersection for the lines of sight of each possible pair of electronic devices through triangulation to create a set of such points; and analyzing the distance between the points of intersection of the set to determine where a subset of the points forms a cluster having a density calculated using certain geographic points representing intersecting lines of sight within a given area of space, wherein the cluster density may be calculated as a set of points located within a predetermined distance from the other points, and transmitting the location of a cluster to a third-party for monitoring of the formation of such clusters.

Embodiments of the present invention also relate to repeating the analysis of the set of points to identify all subsets forming clusters at a particular time, identifying a an object of interest associated with a particular cluster, and determining the level of interest in the identified target based on the proportion of the number of points in the subset forming the particular associated cluster compared to the total number of intersection points forming the set.

Another embodiment relates to where the third-party is a broadcaster, and the broadcaster receives the location and level of interest in one or more objects of interest to assist in determining which object to focus on for broadcasting to a viewing audience.

Embodiments of the present invention also relate to tracking the change in the points of intersection over time to determine changes in the position and size of clusters, wherein changes in the number of points forming a cluster identifies shifting levels of interest between objects.

Another embodiment relates to where the third-party is a security agency, and the particular location and rate of the shifting level of interest in an object indicates a possible security risk at the location to alert the security agency of such risk.

Additional embodiments relate to associating a cluster with the data used to calculate the subset of points forming the cluster, identifying the electronic devices that transmitted the data associated with the cluster, and transmitting a message back to the identified electronic devices.

Another embodiment relates to where a message transmitted to the identified electronic devices is an invitation to form a discussion group between the electronic devices.

An embodiment also relates to where a message transmitted to the identified electronic devices comprises information about the object of interest.

Still another embodiment relates to where a message transmitted to the identified electronic devices is an advertisement for a product or service.

Embodiments of the present invention also relate to filtering the stream of data received by the server to eliminate erratic data values before server resources use the erratic data to calculate lines of sight and points of intersection.

Embodiments of the present invention relate to a computer implemented method of identifying an observers' level of interest in an object at an event or location, which comprises identifying a plurality of observers at an event or location having active electronic devices capable of both capturing images and communicating data over a communications network, monitoring the data and images being transmitted by the active electronic devices to one or more server(s) regarding their GPS positions and compass directional facing, compiling the transmitted data and images generated by the electronic devices on the one or more servers, analyzing the data relating to the position and direction of focus of the electronic devices and metadata of the collected images to determine the observer's level of interest in different occurrences happening at the event or location and recognizing patterns or clusters through the analysis.

Still another embodiment relates to creating a database based on information about the event or location, storing the database on the servers), capturing one or more images or videos of the event at a particular time or over a period of time, tagging the captured images or videos with the information identifying the event or location and a time stamp, transmitting the tagged image and metadata to the server, identifying the tagged image based on the metadata including the time stamp, and associating the image with the correct event or location in the database, storing the image in the database for the correct event or location, and displaying the captured image on a website.

Another embodiment relates to a non-transitory computer readable storage medium having computer-readable instructions executable by a computer processing system stored thereon, the computer-readable instructions comprising instructions that cause a computer system receiving location, directional, and time data from mobile devices to compile the location, direction, and time data for analysis, instructions that cause the system to analyze the compiled data to determine where a line of sight based on the directional data of at least two of the remote devices' could intersect to identify a target of focus for each of the plurality of remote devices, instructions that cause the system to calculate the number of remote devices focused on a particular target at a particular time based on the number of points of intersection at the target's particular location, and instructions that cause the system to determine the amount of interest in each target from the results of statistical calculations of the proportional number of remote devices focused on a particular target at a particular time compared to other targets.

Still another embodiment relates to a system comprising a computer system running one or more applications, wherein the computer system is configured to receive data from portable cameras over a network when individual are using their cameras to point at objects, collect and process data in real time to determine from one or more line of sight of the cameras a location that is of shared interest between two or more users, and identifying a plurality of clusters of users and users contained in each cluster based on the shared interest in a location; and storing user data in association with each cluster.

An embodiment of the system also relates to a server system that stores the location(s) where the line of sight from each of the two or more remote electronic devices would intersect in the database, and an algorithm of the application program that analyzes the stored locations to determine where the locations are clustered.

Another embodiment of the present invention relates to determining the distance and direction between a pair of electronic devices, calculating the point of intersection of the lines of sight for the pair of electronic devices through triangulation, repeating the determination of the distance and direction for each possible pair of electronic devices and the calculations of the point of intersection for the lines of sight of each possible pair of electronic devices through triangulation to create a set of one or more points; and analyzing the distance between the point of intersection for each point in the set to determine where a subset of the points forms a cluster, wherein a cluster is a set of points located within a predetermined distance from all the other points; and transmitting the location of a cluster to a third-party monitoring the formation of clusters. An embodiment of the invention also relates to tracking the change in the points of intersection over time to determine changes in the position and size of clusters, wherein changes in the number of points forming a cluster identifies shifting levels of interest between objects.

Another embodiment of the invention relates to a message transmitted to the identified electronic devices that is an invitation to form a discussion group between the electronic devices or the message transmitted to the identified electronic devices comprises information about the object of interest, where the information can be background information or statistics.

An embodiment of the invention also relates to a system that can run a server application program that can determine the position and facing of remote devices and calculate where the rays from two such remote devices would intersect through triangulation and identify potential objects of interest. The system can store the received data, calculated values, and location(s) of any objects of interest on the system, where the system can run a database program for storing the received data, calculated values, and locations, as well as additional information related to the data, values, and objects. The application program can also analyze the data and values to determine where there are clusters. The system can also have two or more remote devices communicating with the system and transmitting data that can include time, position and direction data to the system for analysis. The data is transmitted as a real time stream of data to the server system. The remote devices have image-capture hardware that can take a digital image or movie, and communication hardware for transmitting the data. The application can also identify the clusters at particular times and perform statistical calculations to determine the amount of interest in each object of interest.

BRIEF DESCRIPTION OF THE DRAWINGS

Further features of this invention, its nature and various advantages will become more apparent upon consideration of the following detailed description, taken in conjunction with the accompanying drawings, in which like reference characters refer to like parts throughout, and in which.

DETAILED DESCRIPTION OF THE INVENTION

Figure 1:
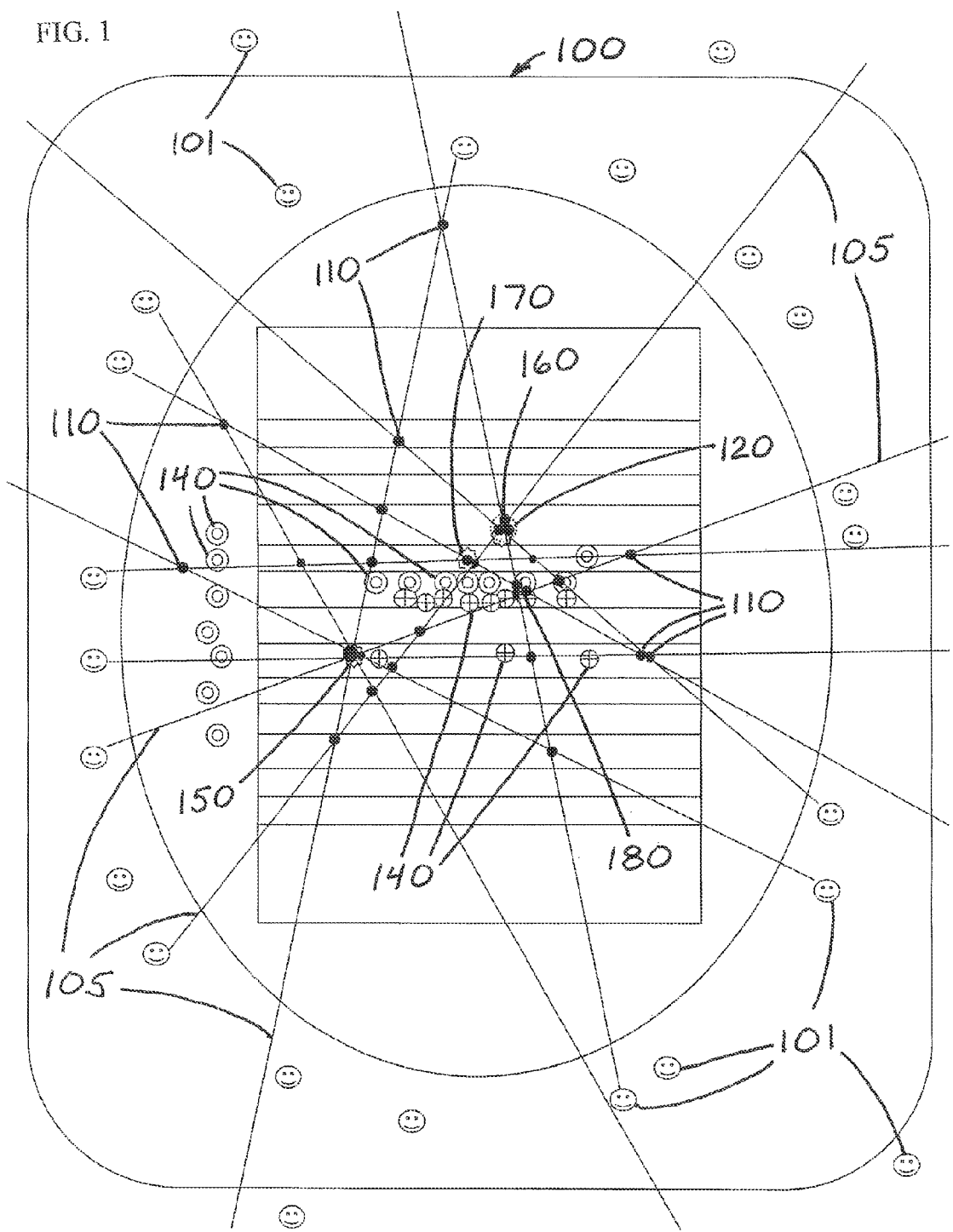
FIG. 1 is a diagram of a stadium holding an event such as for example a football game.

The general principles of the present invention relate to the gathering of data—including time, position, and directional attributes—from image capture devices used by two or more users at an event or within a certain geographic location, and combining, and analyzing the data: (i) to determine the object or area on which the users are collectively focusing; (ii) to quantify the magnitude of interest or proportion of attention each object or area of focus is receiving relative to other objects or areas of focus; (iii) to analyze how the interest-level of, or attention-level to, each object or area of focus is shifting over time; and (iv) for various uses in enterprise, business, or consumer applications.

The principles of the present invention also relate to one or more users having image capture devices communicating with a server system to provide time, position, and direction data and images from an event or location, and the data and images to determine what proportion of attention each object is receiving, and how that attention is shifting over time, where such information may be used to identify potential targeted advertisements.

The principles of the present invention relate to a system and method for capturing images and obtaining information from the image capture devices and compiled metadata associated with the images in real time as image providers focus on particular persons, objects, or sub-events at a location or event.

The principles of the present invention also relate to a system and method comprising identifying persons at an event or location having electronic devices capable of both capturing images and communicating over a communications network, monitoring the data and images being transmitted by the electronic devices to a server regarding their positions and directional facing, collecting the transmitted data and images generated by the electronic devices on one or more servers, storing the data and images on the server(s) for analysis, analyzing the data relating to the position and direction of focus of the electronic devices and metadata of the collected images to determine the persons' level of interest in different occurrences happening at the event or location and recognizing patterns or clusters through the analysis. As the data is transmitted in real time, the interests of the persons at a particular time or time period can be determined to identify what occurrences are of greatest interest at any particular time during the event or at the location. The real-time devices and software updates, communicates, and processes the information at the same rate it is received, particularly when the received data is constantly changing in value.

The principles of the invention can also further relate to using two remote electronic devices in conjunction to both capture concurrent images and the precise time and location of the event, location, or target of the photograph by using the remote application program, wherein the application program captures both the time, UPS coordinates and compass direction of the two or more devices for triangulation on the target of the captured image. The GPS position, compass heading, and time data captured by each of the two remote devices working in conjunction can be used to tag and identify the captured image(s). The data can include the duration and changing direction of focus of the image capture devices used by the observers at the event while focused on the target or when creating the image(s).

The principles of the invention can also further relate to using two remote electronic devices in conjunction to both capture concurrent images and the precise time and location of the event, location, or target of the photograph by using the remote application program, wherein the application program captures both the time, GPS coordinates and compass direction of the two or more devices for triangulation on the target of the captured image. The GPS, compass, and time data captured by each of the two remote devices working in conjunction can be used to tag and identify the captured image(s). The data can include the duration and direction of focus of the image capture devices used by the observers at the event. The images are captured at or over a particular time period, and the collected data communicated the image capture devices associated with the photographs, videos, and images is compiled. The methods include extracting information through statistical calculations, and utilizing the information to establish or increase revenues generated by advertising at an event or directed towards image providers through ranking the level of interest in the objects of focus.

The principles of the invention also relates to a method of obtaining images of events or locations, which comprises generating an electronic request for capturing a photographic image of an event or location at a particular time or over a period of time; communicating the request and information identifying the event or location from an at least one server, to a first electronic device to thus initiate the capture of a photographic image. The embodiments of the invention can further relate to identifying two remote devices, wherein the first remote device and second remote device are geographically separated and capable of obtaining images of the event or location, and sending a request to both devices at the same time to capture image(s) and triangulation data.

The principles of the invention also relates to a plurality of first remote electronic devices running a remote application capable of generating a continuous stream of data about the direction the device is pointing; capturing a photographic image; at least one server running an application program and a database program, wherein the server is geographically separated from the plurality of first remote electronic devices and in communication with the first remote electronic devices, wherein the server is in communication with the first remote electronic device to receive a stream of data about the direction each image capture device is pointing at a given time and/or one or more captured image(s).

The principles of the invention further relate to the use of the time, GPS location, and compass data to triangulate on the target of focus and thereby determine the exact position, direction, movement and location of the target at the specific time or over a period of time. The combination of the devices attributes comprising time data, directional data, and position data from any two remote electronic devices can be used to generate two intersecting lines that produces information about the position and direction of motion and speed of the target through the triangulation calculations. The sequential and repeated capture of the GPS, time and directional information from each of the remote devices pointing towards the target or essentially the same location of the intended target can be used to plot the exact location, motion direction, and speed of a target object over the period of time that two image capture devices are focused on the target by using the same repeated triangulation calculations and method. These repeated calculations generate a cluster of data points from the intersection of the direction of focus for image capture devices that are pointed towards essentially the same location over a period of time that can be analyzed. In addition to the real time data automatically communicated from the image capture devices, either or both remote device users can also assign additional information such as an event description to the image(s) captured by either or both devices to further identify the photographic image(s). If desired, in some embodiments one or more features of the systems or process may operate without using real time data streams or processing.

Cluster formation occurs when two or more observers focus their image capture devices at the same object of interest. Clusters are determined by using the algorithms to process the device attributes. Additional algorithms can be used to analyze a cluster to determine is significance for example by its density. The clusters can be tagged to identify them as actionable items, for example social media, news material, advertising, or data, and then to distribute them using the tag(s). While an ideal situation is one where the clusters are focused together on a precise point, this is often not the case as the size of the location may be large or the observers may focus on slightly different aspects or features of the location. For this reason, cluster density of associated points can be used to determine both a general location of interest or the size of the location of interest. For example, if an actor is exiting a theater after a performance, a cluster of focused points would be formed on or very near the location of the actor, while if a large building was on fire, the cluster of points would be much greater as observers focus on various parts of the burning building. In both examples, the density of the cluster would indicate the size of the location of interest, with the cluster surrounding the actor being much smaller than the cluster surrounding or focused on the burning building. As the observers interest evolves over time the direction of their lines of sight will shift to new locations in order to follow the particular object of interest, thereby causing a change in the angles between the lines of sight and the points of intersection. Such shifting may cause the size and density of a cluster to also change over that time. If an observer's interest shifts to a new object of interest, their line of sight may change sufficiently that the point of intersection will no longer be associated with the original cluster. As more observers find new objects of interest, the original cluster will show a reduction in the number of intersecting lines of sight and a commensurate drop in density as the points of intersection exit the cluster's calculated area or maximum distance from other points of intersection associated with the original object. Similarly, as new observers focus on a particular object of interest, the number of intersecting lines of sight will grow causing the cluster density to increase, as would the significance attached to the cluster aver that time period. These changes can be calculated through a combination of the triangulation calculations to determine the location of the intersection points, and the statistical analysis to determine the clusters and their densities and significance.

A principle of the invention also relates to a system and method used to compile data obtained through a plurality of observers or image providers each utilizing a remote electronic image capture device where the data may either be communicated as real-time feeds or associated as metadata with the collected photographs, videos and images, or both; and extracting information through statistical calculations regarding the level of interest for various sub-targets at an event or location from the compiled data in real time, and utilizing the determined level of interest in locations at an event or the level of interest in particular persons or object at particular times during an event as determined from the statistical analysis of the attendee's or observers' focus, and further to establish the starting bid amounts for positioning advertising at the event from the analysis.

The principles of the present invention further relates to a method of collecting data communicated in real time from image capture devices used by a plurality of observers that focus on a person or object at an event; determining levels of interest in the person or object during the event by processing the collected data; and auctioning portions of the event to advertising bidders in real time, as the event is in progress, based upon the level of interest statistically determined from the data obtained from the plurality of image capture devices. The level of interest can also be determined from the number of images captured of a particular person or object at the event. Real time processing generally refers to generating an output from processing at approximately the same time or in a near instantaneous relationship with the generation of the underlying data or the occurrence of the activity of interest.

The principle of the present invention relates to using the data from a plurality of mobile devices capable of running an application(s) that can identify the position and direction the image capture device is facing, as well as the amount of time the image capture device is facing in approximately the same direction. In a preferred embodiment, the data about the position and direction of facing is transmitted as a real time feed from the mobile device to a remote computer system.

Information is obtained when an electronic device is active without requiring that the device actually take a photograph. The technology is activated by pointing a device having image capture hardware towards some object with the viewfinder open. The device running the application obtains and transmits a stream of data from which the device's position and direction in which it is facing can be determined.

The data about the approximate direction each of the lima', capture devices are pointing at each particular time during an event is collected from each of the image capture devices and transmitted to the remote computer system, such as a server, for processing. The collected data is processed to determine the field of view of the greatest number of observers based upon the direction each observer's image capture device is facing. The data includes direction of focus of the image capture devices used by the observers and the duration that the image capture devices remain focused in approximately the same direction. The position of the specific image capture device may also be collected to better determine the particular field of view for the observer using the particular image capture device.

A principle of the present invention is that a number of attendees at an event, such as a concert, theatrical performance, sporting event, marathon, political rally, circus, fair, or any other public or private gathering can run the necessary mobile application and use their smart phones to capture images or movies during the event. These amateur photographers and videographers may be required to register with the event to obtain the application or be permitted to record the event in such a manner, however, the data relating to where each attendee is focusing their attention at each time during the event can be used to determine the appropriate fees for different advertising locations positioned around the premises of the event. Each of the attendees photography activities is collected by the mobile device and communicated to a computer system to determine which periods of time at the event are of higher interest, and this information is communicated over a network to the one or more potential advertisers who may bid on the advertising time during the event. The number of actual images captured within the same period and of the same location could also be used as a criteria to determine the attendees' level of interest in the particular person or object. The advertisers would then make higher bids for periods of time that are of higher interest to the attendees, and the event organizers can accept the higher bids to increase the amount of advertising revenue derived from the event.

The principles of the invention also relates to obtaining one or more photographs, videos or digital images of an event, physical location, or other photographic target, and more preferably individual sub-targets at an event or location at a particular time or over a period of time, and providing the one or more photographs, videos or digital images to a second party such as an organizer that stores the images and videos in a database for viewing by the public, or broadcasting collected images and videos to third parties via their mobile devices, or conventional broadcast media, such as television, webcasts, or cable services. The images and videos can also be disseminated to service subscribers, posted on websites, or shared across social networks.

The principles of the invention also relate to a method of obtaining digital images or videos of an event, object, person, or location for an event organizer or other requestor. A requestor can be an individual or an organization such as a business owner, event promoter, or performer(s). In one preferred embodiment a request is for photograph(s), video(s) or digital image(s) of a specific event or set of events taken at or over particular times and at a particular location or locations, and capturing the image(s) using any of a variety of photographic effects known to those in the art of photography. In another embodiment, a request can be for photograph(s), image(s) or videos of a specific location taken from many different points of view by either one or multiple photograph providers over a period of time. In another embodiment, two photograph providers can be requested to capture images of the same object, person, event, or location and the information from each provider used to triangulate on the object of the photograph. In yet another embodiment, a request can be for photograph(s), digital image(s) or videos of multiple geographically separated locations all taken at approximately the same time, or sequentially over time.

The principles of the invention also relates to a system and method of communicating the real-time GPS, compass heading, known relative popularity, and time data from each of a plurality of image providers' image capture hardware to one or more servers for statistical analysis of the percentage of image providers focusing on each target or sub-target present at an event or location over the period of time that the image capture hardware is communicating with the server(s). For example, such real-time data communication and collection preferably has a sampling rate of data value per second for each of the data fields, so that at least one OPS data point, one compass heading data point, and one time stamp, is collected each second, and the OPS, direction, and time data points are all correlated, as would be known to one of ordinary skill in the art. In addition, such data communication is preferably done independently and does not require images to be captured and tagged as part of the real-time data collection. Data sampling may be faster or slower depending on the constraints of the system and requirements of the event being observed. Receiving data in real time refers to receiving data from a remote sender with little or no perceptible latency between the time that the data is generated and it is received, e.g., nearly instantaneous or latency is below a noticeable threshold.

The principles of the invention relate to a system used to communicate with remote electronic devices and compile the data obtained through a plurality of observers or image providers each utilizing a remote electronic image-capture device, where the data may either be communicated as real time feeds from the image capture device(s) or associated as metadata with the collected photographs, videos, and digital images, or both; and extracting information through statistical calculations regarding the level of interest for various sub-targets at an event or location from the compiled data in real time.

The principles of the present invention also relate to utilizing the determined level of interest in locations at an event or the level of interest in the particular persons or objects at particular times during an event to establish the starting bid amounts for positioning advertisements at the event from the statistical analysis of the attendees' or observers' direction of their of their electronic devices during the event.

The principles of the present invention relates to a system and a method of gathering and analyzing data collected from image providers in the process of obtaining photographs, videos or other digital images of an event or location at or aver a particular time period, compiling the collected data associated with the photographs, videos and images, and extracting information through statistical calculations, and utilizing the information to establish or increase the amount of revenue generated by advertising at an event or through ranking the interest in captured images.

The principles of the present invention also relate to recognizing a change in the direction of focus of one or more image capture devices at a particular time by identifying the change in the direction of the facing of two or more devices at a particular time and determining a new point of focus different from the initial point of focus as a change in focus to a new or different person, object, or location at a particular time. For example, a first image capture device originally having a particular GPS position and compass facing at a first particular time during an event transmits its position and direction data to the server system, a second image capture device having a different GPS position and different directional facing also transmits its position and directional data to the server system, the real time data transmitted from each of the image capture devices is used by the server system to generate two intersecting lines and calculate the point of intersection to triangulate on the object of focus of the two observers having the image capture devices at the first time. At a different later time, the first image capture device has a change in its directional facing thereby disrupting the first set of intersecting lines. The first image capture device having essentially the same original GPS position establishes a new compass facing. A second image capture device having a first GPS position and directional facing different from the first image capture device is identified by its change in facing at essentially the same later time as the change in facing by the first image capture device. The positions and new facings of each the first and second image capture devices at the later time is used to triangulate on the new point of focus of the two image capture devices. This recognition of the change in focus to a new or different person, object, or location at a particular time can be used to identify shifting levels in interest of the observers at the event or location.

The principles of the invention relate to a method of determining the momentum of an event based upon use of image capture devices used by observers of the event based upon the number of image capture devices pointing at approximately the same location at approximately the same time, where the momentum is determined by the ratio of image capture devices pointing at approximately the same location to the total number of image capture devices pointing at all locations at approximately the same time concentrating on a particular person or object at a particular time. The momentum of the event is determined in real time. The momentum is determined by the ratio of image capture devices pointing at approximately the same location to the total number of image capture devices pointing at all locations at approximately the same time.

The principles of the present invention also related to a system for increasing the revenues from advertising at an event, which comprises a plurality of image capture devices running an application for transmitting data about the position and direction of focus of the image capture device, and at least one computer system in communication with the plurality of image capture devices running the application and one or more advertiser computer systems for receiving a the information about the image capture devices and placing bids for advertising with the event organizer's computer system.

The principles of the invention also relate to providing computer-readable medium for embodying the image capture methods, wherein the computer-readable medium stores computer-readable instructions for performing the processes and methods such as those described herein for capturing images.

The principles of the present invention also relate to a non-transient computer readable medium configured to carry out any one of the methods disclosed herein. The application can be a set of instructions readable by a processor and stored on the non-transient computer readable medium. Such medium may be permanent or semi-permanent memory such as hard drive, floppy drive, optical disk, flash memory, ROM, EPROM, EEPROM, etc., as would be known to those of ordinary skill in the art.

In embodiments of the present invention, the electronic devices can be mobile telephonic devices such as cell phones, smart phones, tablet computers, and personal digital assistants (PDAs), that can communicate over a telecommunications network or the internet including the world wide web. The electronic devices can also be laptop or notebook computers that can also communicate over a telecommunications network or the internet including the world wide web. The electronic devices are capable of capturing a digital photoaraphic image or video, and capable of running a remote application program that can include a GPS position program that can determine the GPS coordinates of the electronic device and a compass application program that can determine the direction of facing of the electronic device. The remote application can determine the focus of the image capture hardware of the electronic device.

The location of a physical place or event can be defined by its GPS coordinates, and the direction of motion or facing by a compass heading. Events may be news, sports, or entertainment events, for example.

The electronic devices can comprise random access memory (RAM), and non-transient computer readable medium that may be permanent and/or semi-permanent memory such as CMOS memory, and flash memory or EEPROM. The electronic devices can also comprise a processor that can that can read the instructions that from a computer readable medium and cause the electronic device to perform the steps of the different embodiments of the invention and to carry out any one of the methods disclosed herein. The electronic device can also comprise the electronics necessary for communication over a telephone or computer network as would be known in the art.

In embodiments of the present invention, the server can comprise at least one computer acting as a server as would be known in the art. The server(s) can be a plurality of the above mentioned electronic and server devices operating as a virtual server, or a lamer server operating as a virtual server which may be a virtual machine, as would be known to those of ordinary skill in the art. Such possible arrangements of computer(s), distributed resources, and virtual machines can be referred to as a server or server system.

A computer or computer system can include a server or a server system, and such computer(s) or server(s) can comprises one or more computers or microprocessors. The computer(s) can also comprise hardware, software and firmware necessary to store, process, and communicate with a variety of other devices as would be known in the art. This could include volatile and non-volatile memory, processors, expansion cards, modems, Ethernet adaptors, etc.

A remote device is a mobile device that is located at a different geographic location than either a server or other mobile device, such that any two devices would need to communicate over some form of telephone or computer network, for example wireless, PSTN, broadband, or internet network. A remote device would also be a mobile device in the field as known by a person of ordinary skill in the art. The transmission of data and communication of information to and from the image capture devices and the computer server system can be done over a network, such as for example a telephone network, a satellite network, wireless network, fiber optic network, a cable network, or any other network or combination of networks known to those in the communication arts.

The number of remote devices transmitting information to the remote server(s) can be used to determine the amount of bandwidth and computing power necessary to process the incoming data and distribute the triangulation calculations and statistical analysis over the distributed system. As a non-limiting example, one server can be handling communication with a plurality of remote devices, another server can calculate triangulation information from the incoming flow of position and directional data, and another server can perform statistical analysis on the cluster(s) of information obtained from the various calculations.

The mobile devices and mobile applications also can perform some or all of the processing that is described as being performed at a server, central computer, or other computer system (e.g., collecting, determining, identifying, etc.). The illustrative methods or processes are implemented using computers, memory, processors, mobile devices, software, displays, communication devices, input devices, and other computer system components known to those in the art.

The remote application program is a set of computer readable instructions that may either be stored on non-transitory computer readable medium of the remote device or downloaded from the server to temporary memory in the remote device, or may be located in the cloud, and that can be executed by a processing system, wherein the instructions and/or processing system may be located on one of the remote devices, on a single computer or server, or distributed over a plurality of remote devices, computers or servers. An application program can comprise one or more application programs. An application program can comprise multiple functions performing different processes for implementing the different embodiments of the invention.

The computer readable instructions further comprising instructions to obtain a time stamp, OPS coordinates and compass heading of the image-capturing device at the time the image capture device is used to capture the image, and instructions to embed the time stamp, GPS coordinates and compass heading of the device with the corresponding captured image(s). The computer readable medium storing the computer readable instructions is non-transitory, and may be for example, a magnetic or optical disc, a magnetic tape, programmable read-only memory, erasable programmable read-only memory such as a flash drive, or other forms of long term memory known to those of ordinary skill in the art. The computer instructions may also be loaded into temporary computer memory such a random access memory or cache memory for execution by a computer processing system.

It should be understood that specific processes are not necessarily run on specific devices, such that the mobile devices may perform (e.g., collectively) some or all of the processing that is described as being performed by a server or central computer. The processing may also be distributed amongst several computers or a cloud, where the illustrative methods or processes are implemented using computers, software, mobile devices, memory or storage, and where the applications and/or data storage may be distributed over multiple processing systems.

The remote devices are mobile telephonic or computer devices that are geographically separated from each other and physically distinct devices. A remote device has a network address that is different from the network addresses of other remote devices and servers, such that each device communicating over a network can be distinguished by their network address, as would be known in the art of network communications.

A remote device is a mobile electronic device that is located at a different geographic location than either a server or other mobile device, such that any two devices would need to communicate over some form of telephone or computer network, for example wireless, PSTN, broadband, or internet network. A remote device would also be a mobile device in the field as known by a person of ordinary skill in the art. A remote device has a network address that is different from the network addresses of other remote devices and servers, such that each device communicating over a network can be distinguished by their network address, as would be known in the art of network communications.

Data is collected from the electronic devices either as a feed communicated in real time from the electronic device to a server system over a communication network, where the application program running on the electronic device collects data about the GPS position and compass facing of the device and transmits the data to the systems server, or by embedding the position and compass facing data as meta data with images being transmitted to the server system.

The accumulation of new data can be combined with previously stored data to improve the accuracy and increase the number of data points for additional calculations or to establish a time progression of data points to plot trends. Using this form of heuristics, the system can learn and forecast future results over time.

The server analyzes the data from the feeds and images being transmitted from the image capture devices to determine the location(s) of the one or more electronic devices and the direction that the electronic device is facing, and calculate the location, direction and speed of the object upon which the electronic device(s) are focused. The object of attention is determined by the server analyzing the number of electronic devices pointed towards the same position. The server software can also calculate the location, direction and speed of the object of an image using the information embedded with two communicated images.

The server determines the position of the object being targeted by the observers by identifying the GPS coordinates of at least two electronic devices, plotting a line of sight from the GPS position in the direction the electronic device is facing for each device as determined by its compass heading, determining the point where the lines representing the direction of focus of the two electronic devices intersect, calculating the angle between the line of sight of the two electronic devices and the distance from the devices to the point of intersection to triangulate the position and compass facing of two or more electronic devices. A baseline can be measured between the GPS positions of the two electronic devices to calculate the distance and angles to the target object as would be known to those in the art.

The triangulation calculations of the point of intersection can be repeated for a plurality of observers present at an event to create one or more groups of intersection points that can represent objects of interest of the observers at an event or location.

Only two observers focusing on an object of interest are necessary to create a cluster. The one point formed by the intersection of the direction of focus identifies an object of interest, and represents 100 percent of the observers focusing on the object.

By calculating the point of intersection for each possible combination of the plurality of electronic devices at an event, a set of points is created. The set of points can be analyzed to determine where the intersection points are clustered. The points of intersection can form one or more clusters representing different objects of attention present at an event. Such clusters are dynamic and change over time as the objects move and as the observers' interest and direction of focus shifts to follow moving objects or shifts to new objects of interest. The change in the compass facing of one electronic device causes a shift in the calculated intersection points for all the lines drawn from the other electronic devices, and a commensurate change in the set of calculated intersection points.

Another embodiment of the invention can also relate to compiling the megadata tagged to and collected with the photographs, videos or digital images of an event, physical location, or other photographic target(s) at a particular time or over a period of time, and analyzing the compiled metadata from the images to extract information relating to the number of images collected of specific targets at specific times or over particular periods of times to determine the focus of attention by the image providers. Tagging of the captured images with the GPS, directional, and time data can be done automatically and in real-time by the application program, and communicated to the server(s), or be done manually by the image provider before communicating the image(s) to allow additional tagging or customization.

A data value relating to the popularity of the object of focus of the remote device can also be correlated with the location/direction/time data, wherein the popularity data can be a subjective value meant to differentiate the object of focus from the other targets present at an event base upon relative popularity, or an objective value determined from previous viewership, monetary compensation for appearing, or other measurable criteria.

The location, direction, popularity, and time can be used as a fingerprint to identify the object of focus and differentiate the object of focus from other potential targets present at the event at the same time. The triangulation calculations from the data transmitted from two or more remote image capture devices pointing towards a particular object of focus can generate a plurality of intersecting lines and a cluster of points where the lines intersect in essentially the same location. Different clusters of points resulting from different lines intersecting at spatially distinct locations at the same time can be used to differentiate the objects of focus from each other. Statistical analysis of the relative number of data points or the cluster size in the same area at the same time can be used to establish the relative popularity of each object of focus. The cluster corresponds to actual objects of interest within the area where the observers are focused.

The clusters, which is an area in space where two or more lines of sight intersect, can be analyzed by determining the arrangement and relative proximity of the points of intersection to each other and calculating a density of points in a given area, as the area encompassing the points of intersection change. The cluster density can also be defined as the points falling within an area a predetermined distance from a center point. The cluster can also be defined as a set of points where each point is no further than a specific maximum distance from all other points forming the set, where the maximum distance may be predetermined or dynamically calculated based on the type of event. In this manner, points that are within a certain proximity of each other may be recognized as a cluster depending upon the type of object being observed.

A cluster of intersecting (or near intersecting) sightlines can represent a potential object or area of interest, and a cluster of users can be associated group of users focusing on the particular object. At least two sets of data can be obtained through the compilation and analysis, including the data related to the object of interest and the data related to the user group formed from the clusters, which may persist after the object of interest is no longer a focus of attention.

The cluster(s) can be further analyzed to determine their size and the percentage of observers focusing on objects of the cluster. A cluster can have a set of characteristics including a number of points correlating with a known object of interest, a size e.g., radius, diameter, unit area, spherical volume, etc.) location of its center, density (i.e., number of intersection points per unit area), percentage of observers or active devices transmitting data, etc.

The relevance of a particular cluster can be determined by the proportion of observers focusing on the specific objects of interest compared to the number of observers focusing on other objects of interest at an event. The relevance can also be based on the density of a cluster, such that a larger number of intersecting points in a smaller area is recognized as being more relevant than a similar number of points in a larger area or a lesser number of points in the smaller area.

The larger the number of observers at an event and the larger the sample size, the more accurate the determination(s) of relevancy, and the ability to extrapolate the relevance and level of interest to other populations such as consumers to determine demographics. For example, crowd focus can show that a particular entertainer holds more interest for a given population that can then be used for product promotions to that population.

Each cluster created at an event represents a unique set of information that can be used to identify the objects of greatest interest, the peak period of the event based upon the greatest number of active devices focusing on the objects of an event at a particular time, and the shifting of interest from one object to another at a given time.

Once a cluster of points is determined the cluster can be used to determine which observers were interested in the objects within the specified cluster, and alerting each of the observers focusing on an object forming the cluster of the other observers creating the cluster.

A cluster can also be tagged with information to further identify the object of interest or determine its relevance. The information can be provided by the observers transmitting images tagged with metadata about the object. Information can also be sent back to the electronic device identified as forming the specific cluster to alert the observers of others focused on the object of interest. The information can be sent from the server to the electronic device and include the identification of the object or objects of interest being focused on, additional background information regarding the object or venue where the event is occurring, and/or advertisements for products that may be endorsed by the object of interest or for items that are related to the event. For example, a car manufacturer may send an advertisement for the brand of car being driven at a car race. Such additional information sent to the observer can then be incorporated into the metadata tags attached to the actual images sent from the electronic devices to the server system.

The formation of a cluster can be used to alert the observers or other parties of a shift in the observers interest or a new occurrence, and draw attention to such objects of interest by broadcasting the new cluster to those involved in the event. The alert can be used to direct other media towards the object(s) of interest. For example, television broadcasters can be alerted of a shift in attention and focus their cameras on new activity that is attracting the attention of the observers, and display highly relevant occurrences on larger general displays. As another example, a shift in attention from the stage or field at an event to the stands can recognized as an anomaly and alert security to an occurrence, security risk, or crisis that may require a response. The anomaly is recognized based on a relevant amount of crowd focus on an unexpected location.

The server application can also filter the data being received from each of the electronic devices, so that data showing erratic position and compass headings are not utilized for triangulation calculations to avoid wasting computer resources on data that will not generate useful points of intersection. For example, data values collected once per second for a compass heading of a device can be excluded from the calculations if the compass heading changes by more than a predetermined angle from a previously communicated value, such as 30 degrees. This value can be adjusted to take into account the type of event or location the observer is at and their distance from the activity. For example, a server would screen out data transmitted from an observer having a known field of view of a stage that would fall within an angle of 45 degrees horizontally or vertically if the changes in directional data indicates that the line of sight continues to change and falls outside the range that would cover the stage. The server can also filter out calculated cluster points that fail to show a coherent pattern, such that the repeated sampling of the location and directional data indicates that each subsequently calculated cluster point falls outside the area of a previously determined cluster. It is also possible for the server to include topographical or altitude data to identify objects that would block or interfere with the extrapolation of the line of sight to a particular remote distance to further filter out stray data. Further filtering can be made based on distance of a particular electronic device from the cluster location.

The server application program, the remote application program, or both may also smooth out the phone attributes to compensate for such things as the shakiness of the observer's hand when capturing images, the movement of the observer, and/or the delay in the transmission from a remote device to a server as well as the delay in calculating an intersecting point from the transmitted data so these artifacts would not effect the various calculations and analysis, as would be known to those in the art. These various smoothing algorithms are known in the art.

The server application program, the remote application program, or both may also have a dashboard user interface that allows a party to view a picture of the lines of sight and the formation of clusters as they occur in real time from the data transmitted by the remote device(s). The dashboard can also be viewed online by third-parties observing the various activities at an event. Such third parties may be advertisers, vendors, security agencies, broadcasters, the event promoters, or viewers, for example.

The captured images may also be used for the preparation of advertisement materials by the advertisement provider for vendors at the event, or local businesses and service providers.

In another embodiment, the system comprises two first party image providers working in conjunction, each having a mobile device running the application software, to capture digital or video images of the same event, object, person, or event, by each obtaining the image(s), as well as GPS, directional, and time information to tag the image(s), and using the additional information to identify and triangulate on the target of the image(s). A remote server that receives the captured image(s) and information communicated from each of the mobile devices, and stores the image(s) with the associated information for later dissemination, and uses the GPS, directional, and time stamp to triangulate on the object of the image capture.

The remote application is meant to run on a remote or mobile electronic device such as a cell phone, smart phone, PDA, laptop computer, tablet, etc. that includes image capturing and transmission capabilities. The image is captured by the device and is transmitted to the server using the application. The image could also be captured by one device such as a digital or video camera and downloaded to a separate device such as a laptop computer or tablet running the application and having the necessary communication link to the server. The computer would then be used through a user interface of the application to select the event, tag the downloaded image, and transmit the image and associated metadata to the server.

Communication between the remote or mobile devices and between the remote devices and a server can be over a wireless telephone network, the internet, or wired communication network, as well as any combination of the above, as would be known to a person of ordinary skill in the art for conveying signals and information between two or more separate devices.

The transmission also may be synchronous or asynchronous, as would be known to a person of ordinary skill in the art for conveying signals and information between two or more separate devices over a network.

In one embodiment, the system also comprises a server, which may be operated by the second party event organizer or advertisement company, and which may be either located at the organizer's business or operated remotely by some other, service provider, such as an Internet Service Provider (ISP) that runs and maintains their own server and provides website hosting and also possibly online storage. The server should have sufficient memory and processing power to run the application and database software and store the collected images, as well as the necessary communication hardware and software to communicate with the remote devices and receive the transmitted images. The server and application program running on the server is capable of storing and keeping track of all events and locations registered with the organizer, or advertiser, as well as each field of data used to uniquely identify each separate event and location that is so registered, including the time of the event, and the time stamp of the captured images that are saved to the server and stored in the database.

The database can be constructed and programmed using any available commercial database program, such as SQL or more preferably MySQL®. The database includes data fields assigned by the organizer to each registered event to identify and distinguish different events and locations. The database can be used to store and organize the event information and captured images using database structures, searches and memory allocation methods that are known to those in the art. The database can also be used to compile and store the real-time communicated or embedded metadata provided by each of the plurality of image provider image capture hardware for use with the analytic engine thr the analysis and statistical calculations.

The server application software runs on the server and provides for registering requestors, events and locations, constructing a list of information to be used to identify such events and locations, and communicate the information to the remote devices and receive data and images sent from the remote device for storage and analysis in the server. The server application software may also provide for billing, and updates of the service or remote application software, such as by automatic downloading of new versions.

The application software may also be distributed over multiple servers, or servers and the remote devices as would be know to those of ordinary skill in the art to better optimize performance and system processing and memory resources. A remote server can be a distributed system comprising multiple interoperating computer servers that collectively support the operation of the functional software components of the application(s) deployed on the server system and one or more remote devices. The distributed system of servers can communicate over wireless connections and/or the internet.

In another embodiment, the remote application may also be implemented as a component of a browser, a browser-based application, or similarly implemented or supported as would be known to those of ordinary skill in the art.

In another embodiment, cloud computing can be implemented as part of the technology for such functions as storing data, the application or support software such as the communication driver, or for use in synchronizing the communication and collection of the data and image provider information.

The application software also comprises an analysis engine that can collect information in real time from remote devices and analyze the collected data to determine the number of image providers focusing on a particular target at a particular time, calculate the proportionate number of remote devices focused upon different targets at the same time or over the same time period, and determine the relative amount of audience interest in ea target or sub-target at that time or over that period using statistical calculations known in the art. Confidence intervals and other statistical values known to those skilled in the art can then be used to determine the accuracy of the amount of audience focus and newly determined popularity of each of the targets. The analysis engine makes sense of the collected data and extracted information, and can store the information for either real-time use at the event or later use at subsequently organized events with the same or similar participants.

The following embodiments and examples present different possible arrangements of the components of the various systems or steps of the various methods contemplated and are intended as illustrative and non-limiting representations to help explain the inventive concepts contemplated within the principles and scope of the present invention. All variations and modifications should also be considered within the scope of the invention as set forth in the claims.

Embodiments of the present invention involve people in a crowd at an event pointing their image capture devices, such as a smart phone, at a target to take a picture. Multiple people focusing on the same target creates a cluster due to the intersecting lines of sight creating points of focus. The people focusing on the same object can be identified, and a message sent to their smart phones inviting them to join a discussion group or an impromptu social network, and to contribute their photos, videos, and comments. The contributed photos, videos, and comments can be shared with others participating in the discussion group or social network, distributed to parties outside the group, or posted on a web page. Photos, videos, and comments tagged as being highly relevant or of great significance based on a statistical calculation can be posted online as news feed material.

in another embodiment, the attributes, which the cluster is tagged with, are utilized to deploy real-world applications such as communicating informational content and social media to clusters of device users determined to be associated with a potential object of interest or received from members of such a cluster. The cluster attributes can also be further analyzed to create a map of the clusters graphically showin their significance or statistical representations of the observers' level of interest in a specific geographical area. Such mappings can also be displayed dynamically showing the shifting patterns of interest and significance over time, as present in a dashboard. The dynamic changes in interest and significance can also be used to direct third-party broadcasting and advertising to the associated cluster(s) of device users.

In another embodiment the cluster analytical and statistical information can be saved and packaged for other enterprise and business uses.

In an embodiment, the people at the event could communicate with a vendor at the event to purchase another person food, beverages, or souvenirs.

One such embodiment of the invention includes at least a first remote electronic device comprising image capture hardware, a second remote electronic device comprising image capture hardware, a server geographically separate and remote from the first and second electronic devices and in communication with the first and second remote electronic devices through a network.

Systems and methods are provided, for example, comprising a plurality of remote electronic devices; at least one server geographically separate from the plurality of remote electronic devices, wherein the plurality of remote electronic devices are all present at a particular event, and the remote devices are in communication with at least one geographically remote server.

Some of the embodiments of the present invention relate to a system and method for capturing images and obtaining information from the compiled metadata associated with the images in real time as image providers focus on particular persons, objects, or sub-events at an event. In another embodiment, the data can be embedded as metadata with each captured image and transmitted to a remote computer system.

In an embodiment, the plurality of captured images can each be tagged with metadata identifying the images position, direction, and the captured images may be communicated to at least one server to be compiled.

Another embodiment of the system comprises at least one first party image provider having a mobile electronic device preferably capable of both capturing a digital image or video and running an application program that can receive information about an event or location and preferably tag the captured image with metadata that is sufficient to identify the event or location where the image was captured, apply a time stamp to specify when the image was captured, and transmit the tagged image and at least a portion of the metadata to a remote server operated by a second party, such as an event organizer, promoter or advertisement provider for compilation and posting on a web page or other site, or distribution for viewing by third parties. The system preferably also comprises a remote device having image-capture hardware and running an application that can cause the remote device to obtain the location of the remote device by GPS positioning, determine the direction in which the remote device is facing using compass or directional software, determine what time the device is collecting GPS and compass direction data, and correlate the time stamp with the collected GPS and direction data. The application should also enable the remote device to communicate the correlated location/direction/time data to a remote server running an associated application.

In some embodiments, systems and methods are provided, for example, comprising a first remote electronic device; at least one server geographically separate from the remote electronic device, wherein the server and remote device are in communication with each other; a second electronic device capable of capturing a digital photographic image in communication with the server; and an electronic request communicated from the first electronic device to the at least one server, and from the at least one server to the second communication device to initiate the capture of a photographic image. An embodiment of the system may also comprise an electronic request communicated from the first electronic device to the at least one server, and from the at least one server to the second communication device to initiate the capture of a photographic image.

In some embodiments, the computer-readable medium storing computer-readable instructions for execution by a processing system performs an image capturing process, the process comprising the steps of (a) generating an electronic request for capturing a photographic image of an event or location at a particular time or over a period of time, (b) communicating the request and information identifying the event or location from an at least one server, to a first electronic device to thus initiate the capture of a photographic image, (c) creating a database based on information about the event or location, (d) capturing one or more images or videos of the requested event at a particular time or over a period of time, (e) tagging the captured images or videos with the information identifying the event or location and a time stamp, wherein the information to be used for identifying and tagging the event and images can include the event name, the event promoter or organizer, the event channel, an event description, the date of the event, the specific time of the event, and/or the specific location of the event (f) transmitting the tagged image and metadata to the server, (g) identifying the tagged image based on the metadata including at least the time stamp, and associating the image with the correct event or location in the database, (h) storing the image in the database for the correct event or location, (i) displaying the captured image on a website.

In various embodiments, the real-time GPS, directional, and time data based upon the image providers' physical location and direction of focus at any given moment is sampled from each of the plurality of image providers present at the event in real time, and communicated to at least one server to be correlated and compiled. The real time data can be monitored and compiled by the at least one server. For example, one embodiment of the invention provides systems and methods which comprises a plurality of remote electronic devices running a remote application capable of generating a continuous stream of data about the direction the device is pointing; transmitting the data to at least one server running an application program and a database program, wherein the server is geographically separated from the plurality of remote electronic devices and in communication with the remote electronic devices, wherein the server is in communication with the remote electronic device to receive the stream of data about the direction each image capture device is pointing at a given time and/or one or more captured image(s) at a rate of at least one per second.

The method can further comprise creating a database based on information about the event or location; capturing one or more images or videos of the requested event at a particular time or over a period of time; tagging the captured images or videos with the information identifying the event or location and a time stamp; transmitting the tagged image and at least a portion of the metadata associated with the image to the server; identifying the tagged image based on the metadata including the time stamp, and associating the image with the correct event or location in the database; storing the image in the database for the correct event or location; and displaying the captured image on a website. The information to be used for identifying and tagging the event and images includes: the event name, the event promoter or organizer, the event channel, an event description, the date of the event, the specific time of the event, and the specific location of the event.

Another aspect relates to a method of requesting the capture of one or more photographic images from an event or remote location comprising sending a request to capture photographic images of an event or location from a first remote electronic device to an organizer, wherein the request includes sufficient information to uniquely identify the event or location; creating a database based upon the request and identifying information; communicating the request and identifying information to one or more second remote electronic device(s) capable of capturing a photographic image; determining to capture the photographic image based upon the request, identifying information, and time that the image is to be captured; responding to the communicated request by capturing one or more photographic images with one or more of the second remote electronic device(s); and conveying the captured images to the server for public display.

In other non-limiting embodiments, the real time data transmitted from each of the image capture devices present at the event can be communicated to the remote servers and stored separately from the images and metadata collected and transmitted to the servers.

In another embodiment the real-time data generated from the image capture devices being pointed at a particular target is communicated to the image capture devices of other image provides to alert each image provider of other image providers focusing on the same target, and communicating information regarding the level of interest in the target to the image providers.

In other embodiments of the invention, systems and methods are provided, for example, comprising a plurality of remote electronic devices including image capture hardware and capable of running software applications; at least one remote server system geographically separate from the plurality of remote electronic devices, wherein the plurality of remote electronic devices are all present at the same particular event or in the same vicinity of an event, and the remote electronic devices are all in communication with the remote server system and can transmit data from each remote electronic device to the server system, and the server system can communicate information back to each remote electronic device.

An embodiment of a method for triangulating on a target can involve identifying a real time feed being communicated by a first active remote electronic device running the application to a server, wherein the real time feed comprises the electronic devices attributes of at least a GPS coordinate of the electronic device and a direction of facing based upon a compass heading of the device at the same particular time, plotting a direction of focus based upon the GPS position and compass facing of the first electronic device. Identifying a second real time feed communicated from a second electronic device to the server comprising the second device's GPS coordinates and compass facing, and plotting a direction of focus based upon the real time feed of the position and facing. Determining whether the direction of focus of the second electronic device intersects with the direction of focus of the first electronic device, and determining the point of intersection of the two lines and the related UPS location of the point of intersection of the two lines of focus. The object of focus can be identified by either the correlating the determined UPS position of the target with known locations of persons or objects at that time, identification of the target of focus by the first user and/or second user of the remote electronic devices, or identification by image recognition by an operator or image recognition software running on the server.

An embodiment of a method involves a statistical analysis of the point of focus for at least a statistically relevant sample of the image capture devices to determine the concentration of observers directing their attention towards a particular person or object and/or the length of time each observer remains focused upon the particular person or object. The periods of time that are of higher interest during the event can also be determined by the proportion of image capture devices focused on one particular person or object during the event. Similarly, the momentum of the event can be determined and followed by the increase and decrease in concentration over time, as well as the shifting of concentration from one person or object to another person or object over time. Additional information can also be obtaining by monitoring the frequency that the same person or Object attracts the concentration of the observers, and/or summing the total amount of time each person or object held the observers' concentration during the event. Comparisons of the length of time or number of observers can be used to determine levels of interest in a person or object.

In another embodiment, the objects of interest may continuously move around a stage or other defined area during the event. In such instances, the momentum of the event may shift from one person or object holding the observers' attention to another person or object are the event proceeds. The momentum is determined from the number of image capture devices being pointed at a particular person or object at a particular time, or by the number of actual images captured of the person or object during the specific period of time during the event. The data transmitted from the image capture devices indicate which devices are pointing at approximately the same location at approximately the same time. This data can also be used to identify which person or object was being observed even though they may be moving. In such instances, there would be no fixed field of view, but instead a person or object of interest. By determining changes in the number of observers concentrating on particular persons or objects and the shifting of concentration between different persons and objects over time, the amount charged for advertising during periods of higher concentration can be increased thereby increasing overall advertising revenues. Momentum therefore reflects how the concentration varies with time, and can be determined by the ratio of image capture devices pointing at approximately the same location to the total number of image capture devices pointing at all locations at approximately the same time. The total number of image capture device in use by observers could be obtained from the number of applications transmitting data to a remote computer system or communication platform, since each device could transmit a unique data stream. The collection of these real time data streams being transmitted over a network is then processed by a computer system to determine the necessary information on concentration and momentum. The data continuously streams between the remote application running on the remote electronic device and the communication platform, and the data is processed to tracked significant shifts in the crowd's behavior and identify areas of crowd focus referred to as clusters. The data includes each electronic device's location and line of sight, and changes in the position and direction over time is stored anonymously and processed.

In an embodiment of the invention, specific advertisements can be transmitted back to the display screens of the image capture devises being used by the observers. The advertisers could thereby present their selected advertisements to particular observers through the image capture devices based upon where the observer is concentrating at the particular time of the event. For example, an observer focusing on one performer may receive an advertisement for the particular clothing or footwear being worn by that performer by the advertiser. Similarly, a sponsor for the event may wish to advertise their product to particular observers focusing on the object of interest. For example, a car manufacturer may want to present and advertisement to an observer at a race track when the observer focuses on the manufacturer's car. The advertisement may take up only a portion of the observer's display screen, or be present for only a short period of time. The advertisers can bid on who's advertisement will be transmitted to the observer at the particular moment, and a proportionate number of ads based upon the ratio of bid amounts may be displayed on a fraction of the image capture devices. This transmitting and display would be in real time during the event.

An embodiment of the present invention relates to a method of increasing the charge for advertising during an event, which comprises determining the momentum of an event based upon use of image capture devices by observers of the event; and increasing the amount charged for advertising during time periods of higher momentum based upon the momentum of the event at the particular period of time. The momentum is determined based upon the number of image capture devices pointing at approximately the same location at approximately the same time. The momentum is determined based upon the number of number of images taken during a particular time of the event. The momentum is determined based on the focus of the devices about a person or object upon which the devices are focused. The momentum of the event is determined in real time, and the charge for advertising fluctuates in real time based upon the current momentum of the event. The momentum is determined by the ratio of image capture devices pointing at approximately the same location to the total number of image capture devices pointing at all locations at approximately the same time.

An embodiment of the present invention relates to a method of dividing up advertising time by auctioning, which comprises applying information collected from mobile devices at an event as part of determining the proportion of observers concentrating on a particular person or object at a particular time during an event; transmitting the proportion of observers concentrating on a particular person or object at a particular time to one or more advertisers; receiving bids over a network from the one or more advertisers for presenting an advertisement to the observers on their respective image capture displays; determining the proportionate number of image capture devices displaying a particular advertiser's advertisement based upon the proportion of each advertiser's bid amount; and transmitting an advertisement from a particular advertiser to the proportion of image capture devices for display in real time during the event. The advertisement is communicated to an observer's image capture device, and displayed in at least a portion of the image capture device's viewer. The image capture devices receiving a particular communicated advertisement are chosen randomly from all image capture devices present at the event. The bidding by advertisers is an automated process that occurs in real time.

An embodiment of the present invention relates to a system for increasing the revenue from advertising of an event, which comprises a plurality of image capture devices, which are running an application; at least one computer system in communication with the plurality of image capture devices running the application, wherein the computer system collects data from each of the image capture devices identifying the direction in which the image capture device is pointing, and can communicate with at least one advertiser computer systems to accept bid amounts for the timing and placement of advertisements; and one or more advertiser computer systems in communication with the at least one server for receiving information on the present direction the plurality of image capture devices are pointing, and placing monetary bids for advertisement positioning with the computer system.

An embodiment of the present invention relates to a method of increasing revenue from advertising of an event, which comprises determining the periods of time at the event that are of higher interest based upon input from mobile devices of one or more event attendees; communicating information about the periods of time that are of higher interest to one or more potential advertisers; receiving bids over a network from the one or more potential advertisers for advertising time during the event at or near the periods of time of higher interest and accepting one or more bids to derive advertising revenue from the event. The determination of high interest periods, providing of information on high interest periods to potential advertisers, receiving of bids from potential advertisers, and accepting of bids from potential advertisers is all done in real time during the event. The input from one or more attendees is based upon each attendee's photography activities. The photography activities include the number of attendees taking photographs at a particular time, the number of image capture devices focused at approximately the same location at a particular time, and/or the number of images captured of the approximately same location at approximately the same time. The determination of the periods of time of higher interest is projected in advance of the event with the receiving and accepting of bids occurring prior to the occurrence of the event.

The periods of time can be divided or apportioned between two or more of the highest bidding advertisers, where such apportionment can be a function of the amount of time the advertisement is presented on a particular display, or the amount of viewing area that is provided to each advertiser over the same period of time. That is, two or more advertisements may be shown on the same display at the same time, but the higher bidder would present a larger ad taking up a greater amount of the display viewing area, with the proportion of the area showing a particular advertisement based on the respective amounts that were bid.

In another embodiment, the method is for auctioning off positions for the placement of advertisements at an upcoming event which comprises collecting data from a plurality of image capture devices over the duration of a previous event, processing the data through the use of a computer system to determine the field of view held by the greatest number of observers for each particular time period of the previous event, and in response to the processing, identifying the fields of view with the greatest number of observers over different periods of the event. By identifying the fields of view with the greatest number of observers, the placement of advertisements or display devices can be located where they will be more effectively presented to the observers. The locations of these identified fields of view can be transmitted to interested recipients.

An embodiment of the present invention relates to a method of auctioning off positions for the placement of advertisements at an event, which comprises collecting data communicated from a plurality of image capture devices operated by a plurality of observers at an event over the duration of the event; processing the collected data to determine the field of view of the greatest number of observers for each particular time period of the event; and responsive to the processing, identifying fields of view with the greatest number of observers over different period of the event. The method further comprises transmitting the identified field views to interested recipients. The data is collected from each of the image capture devices about the approximate direction each of the image capture devices are pointing at each particular time period of the event. The data is collected from each of the image capture devices about a person or object upon which the devices are focused. The data is collected from each of the image capture devices about a number of images taken during a particular time of the event. The method further comprises: establishing a starting price for auctioning the placement of advertising within each identified field of view for a subsequent event. The method further comprises auctioning off each identified field of view in real time during the event by collecting bids in real time, and displaying the highest bidder's advertisement on a display in the auctioned field of view in real time during the particular period of the event.

In another embodiment, the information obtained from one event can be used to establish advertising prices or starting bid amounts for any subsequent events having the same or similar concentrations of focus and/or momentum. The periods of time of higher interest would be projected in advance of the event and the receiving and accepting of bids would also occur prior to the occurrence of the event. In this manner, the advertisers would be aware of the incurred advertising expenses before the event and be able to account for the costs without any surprises.

The information obtained by processing the data can be used to increase the revenue generated from the advertising at the event. By identifying the best locations for advertisements based upon observers' fields of view during an event, and use of a bidding process to determine which advertisements are displayed when, where, and for how long, higher fees can be generated compared to providing blanket pricing and fixed advertisement displays. Using these embodiments of the invention, advertisements can be matched with appropriate placement fees.

Accuracy of the field of view is determined by how closely the direction of focus coincides with the position of an advertisement or message, 'The closer to the center of the observers' field of view, the more accurate is the placement of the advertisement. The frequency that the observers' direction of focus is drawn to the location of the advertisement, such that it fills within the observers field of view also can be used to determine the effectiveness of the advertisement's positioning.

The frequency, amount of time within the observers' field of view, and the number of observers with a suitable field of view of an advertisement or message can be used to determine appropriate placement fees or starting bids for advertisers wishing to place their ads in these identified strategic locations.

In some embodiments, individual events and locations are registered with the organizer and stored in a database for later tracking of submitted images having metadata identifiers that match the particular event, object, or location information, as well as a time stamp that is matched to the particular time or time period of the events. The information used by the organizer or advertiser to identify each separate event and location can include the event name, the organizer's name, an event channel, an event description, the date and time of the event, and the particular location of where the event is taking place. The location of the event can be specified using GPS coordinates of the actual location, such as for a small building, or coordinates of the boundaries of a geographically dispersed region, such as a fair ground or large convention center. These data fields are provided to the remote device operated by the first party photographer to tag each captured image with the metadata necessary to link the transmitted image to the particular event. The location of the first party image provider can also be established based on the GPS coordinates of the remote device or image capturing device, and used to determine the image provider's actual location or travel distance to the event or location.

A time stamp associated with each image is used to make sure the image was captured during a specific time, such as during the actual event or within the range of time that a requestor wanted photographic images or videos taken of a particular event or location. The time stamp can be compared to the start and end times of each particular event, as well as the GPS position, and possibly the direction and point of focus of the image capture hardware of the mobile device or camera, to confirm that the captured image is of the correct event taken at the proper time. The time stamp could then be used to screen images and videos that were taken outside of the requested time frame.

The images stored on the second party organizer's server can be displayed on a web page designed for the particular event, and accessed by the public by selecting the event or location from a list supplied by the organizer, or the images may be transmitted or downloaded to third party's remote devices for viewing on the device based a request to receive such images from the organizer. The third party may also be the original requestor. The images could also be shared over a social network, or communicated to viewers that have registered with or requested such captured images.

The collected data can also be used to adjust aspects of an event to draw a plurality of observer's attention towards particular fields of view, and/or maintain their concentration on the particular location for a specific length of time. Advertisers can also place dynamic ads at an object that draws the attendees' concentration.

When the information is collected from the plurality of image capture devices in real time, the method can also comprise auctioning off portions of the event by having the advertisers bid for the particular locations drawing the highest levels of interest, and/or periods of time when the observers concentration is most directed towards the particular locations. The bidding can be conducted, automatically by the advertisers setting predetermined amounts or ranges that should be bid, as the real time data is processed and the levels of interest determined for each location and time period. Displays, such as LED signs or television screens, that can change the information or images being presented in real time can be used to shift between different advertiser's ads based upon the amounts each advertiser has bid. The determination of high interest periods, providing of information on the high interest periods to potential advertisers, generating and receiving of bid amounts from the advertisers, and presentation of the highest bidding advertisements on various displays can all be done in real time, as the audience is viewing the event, such as by an automated system or auction/bidding application.

If desired, each of the illustrated methods may be implemented with or without including an auction step or communication with third party computer systems, such that each method may involve only collecting and processing the data to obtain the information of interest without involvement of third parties that are not involved in the collection and processing of the data.

If desired, any auction or bidding step can involve automatic electronic reception and processing of bid amounts, and include implementing all or substantially all of the auction or bidding online and/or over one or more network(s).

An embodiment of the present invention relates to a non-transient computer readable medium configured to carry out any one of the preceding methods.

In some embodiments, a service may publish one or more event tags or identifiers that are distributed to users or made available for use. Such tags may only be distributed or made available to individuals that are at a particular geographic area during a particular time window of an event corresponds to the tag. For example, only individuals present at a concert would be given access to a particular tag because their device and time indicates that they are at the concert. An alternative approach would be to permit the tag to be used without restrictions, but for example, the service provider (e.g., application running on mobile and server equipment) by way of its server would be able to block or filters images or other media from providers that do not meet certain time or location criteria.

In some embodiments, a private tag can be implemented. For example, a wedding can publish a tag for the ceremony and reception that is used by the attendees and available to those attendees (only to those attendees, e.g., others could be blocked from seeing the tag). The attendees can take pictures and tag pictures with the one or more private tags to, for example, build an instant album of the event on a provider or web server or other equipment. Using multiple standard or edited tags can allow further sorting and organization.

In some embodiments, the event may be transient or dispersed in location and the service can follow the event irrespective of the individuals taking the images or the movement of the event. For example, individuals viewing a marathon may be viewing at different locations or may move to different locations. The images from the various audience members can be organized by location and time to add to the available resources for fans watching the event. In a preferred embodiment, two separate remote device users could be coordinated to work in conjunction obtaining images of the same runner from two different locations and correlating the time, GPS, and directional data from each remote device to triangulate on the particular runner in real time. The real time information and images tagged with the metadata identifying the images can be communicated to the server from each remote device and saved. The combination of GPS coordinates, time, direction and image data can then be used to determine the location, identity, direction and speed of that runner on the course. The triangulation calculations can be done by the server on the data transmitted from the image capture devices. The server can compile the information for multiple runners from numerous separate remote device users and correlate all the GPS, directional and time data to provide a map of the runners. This information can then be provided to other viewers on their remote devices, where they can view the images of the runners and know their relative positions on the course in real time. The images can be labeled for example as "runner X at 20 mile marker, brought to you by ESPN" by the remote device users.

Further in regard to this embodiment, a plurality of image providers located in relative proximity to a group of runners at a particular location along the race route could all provide images of the group during the period of time the runners are in view, where each image is tagged with at least the GPS location of the provider, the direction of focus at which the image is taken, a time stamp, and an identifier indicating the target of the image. Such meta data is then extracted from the associated images and compiled in a database for real time analysis to determine which runners are the focus of attention at the particular stage of the race, and providing the information in real time to other image providers further down the race route so they may identify and focus on the more popular or interesting runners to increase viewership.

Advertisers or event promoters could also post the images and videos in almost real time to promote the particular event or location as the event was occurring, or download the captured images to create advertisement and marketing materials to sell their services for future events and promotions.

The analytic data relating to the relative popularity and amount of focus on each target or sub-target present at the event may also be provided to advertisers or event promoters to better allocate resources at future events, where such information may be provided for a fee.

Embodiments of the invention also relates to a method of capturing one or more images of events, objects, or locations by first party image providers, which comprises registering one or more specific events or locations with an organizer, creating and assigning particular data fields to each separate event, sub-event or location to be stored in a database for uniquely identify one specific event or location and distinguishing that event, sub-event or location from all other registered events and locations, creating a database for storing the registered event and the particular assigned data fields associated with the event or location, and storing any event registration data in the database, wherein the database may be operated by the organizer or by a separate service provider that operates and maintains the server, database and/or website, providing application programs that run on remote devices to amateur and professional photographers and individuals that will capture images of the events or locations, transmitting a list of data fields to the remote device running the application that identifies the specific event or location, selecting the particular set of data fields that uniquely identifies the event or location being photographed or captured by the first party image provider, tagging the captured images of the event or location with the particular metadata and a time stamp, transmitting the tagged image(s) to the server or second party organizer, associating each transmitted image with the correct event or location based upon the metadata attached to each captured image, collecting and storing all the transmitted images in the database for the particular event or location identified, correlating all such collected images based on the tagged metadata and time stamp for display or publication on a webpage or other website for either public display or viewing by selected or authorized third parties, or for downloading by the public or select third parties.

The information to be used for identifying and tagging the event and images can include: the event name, the event promoter or organizer, the event channel, an event description, the date of the event, the specific time of the event, and the specific location of the event. Other information, such as the initial popularity or relative popularity can also be used to identify and differentiate the different targets that image providers may focus on. The use of a specific time, specific location, and popularity can be used to categorize individual sub-events within a general event. Such sub-events may be separate displays, presentations or performances that are presented simultaneously at different locations, or sequentially at the same location but at different times. Each sub-event would therefore have their own identifying information including a specific location and time that would be associated under the general event.

The first party image providers may be common individuals with the remote application running on their commercial, remote devices, such as amateur photographers, or they may be dedicated professionals purposely hired to record and document the events with high quality photographic or video equipment. In the embodiment where the first party image providers are professionals, they may preregister or have an account with the event organizer and provide higher-quality images and video for a predetermined price bid set by the organizer or their own counter—price bid. In another variation, the provider may provide a sample of the images(s) or video(s) and set a bid price for the organizer to obtain the captured image(s) or video(s). The amount bid by the professional photographers that have previously identified themselves as providing similar pictures within that price range would preferably be paid through a pre-established account. In such instances, payment of the predetermined price or bid price may be processed by computer system or other internet payment options to the professional provider's account. In some embodiments, if the amount in the organizer's or requester's account is insufficient to pay the photographer's bid price, the crowdsourcing service will send a message to the requester asking for a deposit sufficient to cover the amount the account is lacking in order to cover the payment amount and continue the transaction with the image provider.

The second party organizer or service provider can receive information from a requestor, such as an event promoter, location owner, or marketer through the internet, web or telecommunication link and logs the request to the account of the particular requestor, regarding an upcoming event that they would like to capture images and videos of for promotional purposes or real-time advertising, so potential customers and participants can see first-hand what is occurring at the event. The second party event organizer may also enter event information into their own system or a system being operated by another service provider by using a mobile device running an application having a user interface that links with the server, or through a website linked to the server. The organizer can then create an entry for the general event and any sub-events in the database. Such events may be, but are not limited to, concerts and performances, trade shows or promotional events, business grand-openings, street fairs, games or sporting event, awards or other ceremonies, rallies and political events, military engagements, live news and other media events. An event is generally defined as any occurrence that could be captured as a continuous series of images taken of precise locations at a precise time or over a period of time, where the image could be captured using any visual, physical or electronic medium.

An second party event organizer or service provider receives the information identifying an event or location from the requestor through the internet, web or telecommunication link and logs the request to the account of the particular requestor (also referred to as a user or service subscriber). The request may be received by a computer server or telecommunication device running the necessary software for logging and tracking such requests, and having sufficient permanent memory for storing the information provided with the request and the information regarding the service subscribers account, and the images to be later provided. The service provider enters the necessary information provided in the request in a permanent record stored in a server that can be used for managing images provided in response to requests. The requestor may also be a third party viewer of the images.

An event organizer or service provider receives the GPS coordinates of the location to be photographed and the time of the event(s) based on the request and communicates the request and info to image providers that may be in the vicinity of the requested location. The identification of the image providers capable of capturing the requested photographic image may be a real time search based on GPS coordinates of the providers' remote devices. An electronic signal is sent out to photograph providers in the vicinity of the requested location for the photograph to ping their mobile or computing devices to obtain information, such as GPS coordinates, on their current locations. The photographers or image providers identified by these criteria are then contacted preferably through application software running on their own mobile or computing devices. This screening process allows image providers to receive only requests for capturing images of events or locations that are within a reasonable distance from their position, and allows the organizer to manage the number or providers contacted for each such event or request.

The photographer(s) or image providers(s) capture the requested image or video using a mobile electronic device having suitable image-capturing hardware and memory, and convey the captured image back to the organizer through the various communication links to the server. These communication links may be hardwired, wireless or internet protocol or any combination thereof.

In another preferred embodiment, the image provider or photographer can set up the image-capturing hardware running the application software in an always-on mode where the image capturing hardware is accessible and in communication with a event organizer, so that requests for the capture of an image can be sent to the specific hardware and acknowledged by the application software. The location and direction of the image-capturing hardware can be sent to the event organizer, so that when a request specifying the location based on GPS coordinates is received, the application can automatically capture the requested image(s) or video(s).

All the necessary geographical information, which would include GPS and directional information such as from a compass application, is sent to the image providers. The geographical information from the request is input to the image provider's application software running on their mobile or computer device and used to inform the photographer or image provider of the correct location where the application may also guide and confirm the direction accuracy, elevation, angle of view, lighting, time of day, point of focus, etc, for the actual photograph. The hardware and application software can also capture the digital image and compress the data for storage and communication back to the service providers and to the organizer.

The image or video asking price if any is provided, and any metadata related to the image provided is communicated to the organizer or, service provider, which validates that the digital image is being taken of the correct location at the correct time based upon a comparison of the UPS coordinates, time stamp and other metadata captured at the time the photographic image was captured. In some embodiments, the pictures will be self evident (i.e., pictures of Mount Rushmore) and may not need a tag. Also, the GPS alone or in combination with a time stamp should be sufficient to identify where (and when) the pictures were taken to verify if they were taken in accordance with the request that was made for them.

It should be noted that the description for capturing a still image presented above can also be applied to capturing video images either by using a digital video camera, a digital camera with a video setting or a still motion camera that can rapidly capture a succession of still frames that could then be assembled into a moving picture.

In another embodiment, requests can be sent out to multiple photograph providers present at the same event but situated at different GPS locations with their image-capture hardware directed towards the same object or event. In this manner, remote devices users A and B can capture image(s) of target object or event C at the same time using the GPS and compass data from the remote device application(s) to triangulate on target C. The location, direction, speed, and orientation of a moving target could then be calculated by triangulation from the GPS and compass information captured over a period of time at suitable intervals and tagged to each respective image. Each of the remote device users would follow or track the movement of the target object and either store the time, GPS and directional information as metadata associated with the captured images, or communicate the information to the server to be saved and used in the calculations at a later time. The GPS and directional information may be collected every second, or more preferably multiple times per second, where the suitable interval is determined based on the object's speed or the amount of detail required to be captured. The GPS and Compass location of Target C is therefore known due to triangulation. This is also true for moving targets if the cell phone users follow the target (i.e. we beam coordinates for triangulation back to the server every second).

Either or both of the mobile device users can then assign a name or description to the image or sequence of images to thereby label target C as event D. The event information and label is embedded or otherwise appended to the captured image(s). All other third party viewers can receive the images labeled as event D when viewing or taking pictures of target C.

Further in regard to this embodiment, the plurality of image providers present at the same event may focus their image capture hardware at separate people or objects at the same event (e.g.: performers, musicians, athletes, horses, race cars, hot air balloons, etc.), where each person or object would constitute a separate target C, and images of each separate target $C_1$-$C_n$ would be captured by the image providers. The multiple images may be captured at the same time or over the same period of time during the event.

In various non-limiting embodiments of the present invention, the tagged image and identifying information can be saved to a server that may be geographically separate from either or both remote devices, wherein the server can embed or otherwise append the identifying photographic information to the image for saving to a database, posting on a web site, querying, and sharing the image and information with viewers, and across social networks. The server may communicate the captured image and embedded information to other users running the remote application, or subscribing to a notification or updating service.

A non-limiting example of a preferred embodiment will now be described in reference to the Flow Chart depicted in FIG. 1.

An event organizer registers an event and enters the event information including: the event name, event channel, event description, event date, event time, and event location. The event information is then written into a database program running on a server. A first party with a remote device such as a smart phone (e.g., Droid®, iPhone®) turns on the application program on the device. The application notifies the server system that the remote device is active and provides the device's location by transmitting its GPS position data to the servers. The server identifies events within a specified vicinity of the remote device's GPS coordinates and communicates a list of such events to the remote device and first party image provider. The event information is transmitted to the remote device to populate the tagging feature of the user interface. The first party takes a picture of the event, and optionally tags the picture with the event name, a title, and a description of the photo and event. The photo and tagged metadata including geographical data, first party data, event name, title, and description is saved and stored on the servers. The public or other third parties can then view the saved pictures by using an event viewer and selecting the photographs by selecting the particular event by name, date, location and/or channel. The third parties can view the saved pictures on the web or download selected ones to a phone or other remote or mobile device.

In one non-limiting, illustrative example of a preferred embodiment of the inventive method, the service provider is CrowdOptic and the event organizer is a promoter hosting a public event. The event organizer communicates with CrowdOptic by internet, e-mail, text messaging, instant messaging, webpage logon, telecommunication or other communication method known to those in the art, to register an upcoming event. CrowdOptic logs the request to the promoters account and registers the event in a database. Particular data fields that will be used to uniquely identify the event and tag all images or videos submitted for the particular event are assigned to the event, wherein the information used for identifying and tagging the event and mages includes: the event name, the event promoter or organizer, the event channel, an event description, the date of the event, the specific time of the event, and the specific location of the event, and a specific time and specific location for categorizing individual sub-events, such as separate acts or presentations that make up the general or overall event. Additional information such as the name of individual performers, sponsors, companies, products, demonstrations, etc. can also be provided to identify each sub-event. CrowdOptic communicates a notice of the upcoming event to photographers and image providers that are running the associated mobile application on their remote or mobile devices by internet or telecommunication channel, such as by e-mail alert, text message, instant message, web-posting or other means known in the art, to alert the image provides to the opportunity to capture images or videos of the event. The communication also includes all of the information to be used for identifying the particular event, so the image provider can identify the event by its time, location and description, and later tag each captured image with the event information and the time stamp of when the image was captured, as metadata, so it can be accurately identified, associated with the correct event and properly stored in the CrowdOptic database. The image provider is then present at the event and captures one or more images and/or videos of the event. Each captured image is tagged with the identifying information by the application program and transmitted automatically back to the server operated by CrowdOptic. The server program uses the metadata attached by the remote application to each image or video that is received to identify the correct event that the image or video is associated with, and stores the image or video data in the database allocated to the identified event. The time stamp is used to organize received images in their proper sequence for storage in the database.

In another variant of the illustrative example, CrowdOptics does not send a notice to the remote application program or image provider, but instead the image provider activates the remote device application and uses the application user interface to download updates to populate a list of events, which can be provided as a scroll-down list, and select a particular event or events from the list of all available events to obtain the additional information from the server. The additional identifying information populates the tagging portion of the user interface, and is used to tag each captured image for transmission and storage in the database as described above.

The following examples are not meant to limit the scope of the presently claimed invention, hut are meant to further describe particular features or applications of the preferred embodiments of the method and system described herein.

A first example relates to an organizer requesting images and videos of the New Years Ball dropping in Time Square at 12:00 AM. The request is conveyed to all first parties running the necessary application and all registered professional photographers that are determined to be in the immediate vicinity of Time Square. All image providers receive the request, so one or more images or videos of the event may be obtained and communicated back to the organizer. The organizer may then collect and store as may or as few of the images communicated back to the organizer's server and pay the bid price for each image accepted from a professional image provider. The multiple images of the single event may then be compiled into a mosaic or collage or time sequence based upon each of the tagged image's metadata representing its location, description, and time, as determined by the application and server software.

To a second example, a remote electronic device may be left pointing at a location such as Time Square on New Years Eve with the application software running in the background to actuate the image capture hardware of the remote device whenever a notice or request coinciding with the location, description and real time is received. The image capture may then be handled automatically without the involvement of an operator "checking in" or triggering the image capture.

In a third example, multiple photograph providers present at the same event, such as a space launch by NASA, may capture multiple images from different locations, at different angles, at different times to provide better coverage of the event while avoiding the effects of interference that may reduce the quality of the image captured from one direction, such as changes in the lighting, weather or physical obstructions, by using multiple views.

In a fourth example, the event is a trade show or fair having a multiple vendor booths located throughout a building or grounds, and where exhibits and demonstration are presented at various times throughout the day or days. The event promoter registers the event with the organizer and provides a detailed list of exhibitors' locations and a schedule of events for each such exhibitor to the organizer. The registration can be accomplished using the organizer's website comprising a registration page, or using a remote device to transmit the registration information to the organizer. The organizer registers the general event information, including the event name, event channel, event description (e.g. electronics show, car show, antiques show, etc.), even date and time, and event location (e.g., specific hotel, convention center, fair ground, etc.), and creates database entries for the general event and each sub-event comprising the exhibitors' names, specific locations, descriptions of the exhibits, and any date, time and location of particular demonstrations or presentations. The compiled information is communicated to the plurality of image devices running the application, and presented as a list to the first party image providers having the application running. The remote devices transmit their respective GPS data to the organizer to specify the location of the one or more image providers, so that the information about events may be prescreened by the server application and only information regarding local events is communicated to the remote devices. The one or more image providers can then capture images of different exhibits or demonstrations occurring at the same time but at different locations throughout the event, or capture exhibits or demonstrations presented at different times but at the same location. Each application running on each remote device tags each captured image with the proper identifying information for the specific sub-event time and location, and transmits the tagged image(s) to the organizer's server. The location of a physical place or event can be defined by its GPS coordinates, and the direction of motion or facing by a compass heading. The server application sorts all of the images provided by the different first party image providers based on the metadata tagged to each image, correlates the images with the associated databases created based on the information, and stores the correct images in the proper databases. The server can post the saved images to specific web pages for other viewers to see what is happening at particular exhibit booths or interest or at specific demonstrations based upon their interests in almost real-time. Such images or videos could also be download, back at an exhibitors company headquarters for example to see how anew product is received by the marketplace instead of waiting to receive a delayed report from the field.

Further in regard to this example, the real-time data collection or metadata tagging of each of the collected images or videos is collected by either the organizer or a third party, and extracted by an application program. The extracted data is then compiled by time, date, GPS location, direction of focus, and any other selected data fields or tags, such as initial popularity, and stored for analysis. The same application program or a separate application program may then analyze the compiled data to determine the number of image providers focused on each object or images collected at each vender booth over the course of the event, or may more finely analyze the data to determine the number of images collected for each exhibit or demonstration at each vendor booth. The information can then be used to determine the most popular vendors, events, and demonstrations based upon the proportion of image providers attending each both, event or demonstration, and/or the number of image providers focused on each object or images and videos collected of each booth, event, or demonstration in comparison to the total number or images providers and/or images collected. The gathered data can then be provided to the vendors to identify which ones drew the largest crowds and which events and demonstrations attracted the most attention.

In a fifth example, the event is a concert having multiple band members on stage at the same time, but moving around the stage or entering or leaving the stage at various points during the show. A plurality of image providers can obtain images and videos of the individual band members present on stage at the same time and communicate the images to the application server. The real-time data collection transmitted from the image capture devices can be collected by the server system in real time by an application program. The collected data is then compiled by time, date, UPS location, direction of focus, and any other selected data fields or tags, such as initial popularity. The UPS location and direction of focus of the image capture devices is used to calculate the point of focus of the image capture devices through triangulation. The number of image providers focused on essentially the same location or performer generates a cluster of points that can be statistically analyzed to determine the level of interest of the crowd in each band member at that particular time. The same application program or a separate application program may then analyze the real time data to determine the number of image providers focused on each performer over the course of the event, or may more finely analyze the data to determine the number of image providers facing towards a particular location at a particular time during the event. The information can be used to determine the most popular performer based upon the proportion of image providers focused on each performer in comparison to the total number of image providers present over the period of time focusing on the different objects at the show. The data can then be provided to the vendors or advertisers to identify which performers attracted the most attention.

In a sixth example, the image providers may be in the audience of a tennis match, where each or the tennis players participating in the match start on a particular side of the court, which is determinable through the UPS location and direction of focus of the image providers at the start of the match, and have a relative popularity compared to the opponent in the match. By triangulating the focus of any two of the plurality of image providers at a time, tracking the location of each player over time, and determining the number of image providers focusing on each of the players at a specific time or over a period of time, the particular times and points of interest during the match can be determined, and a statistical analysis can be done to determine new relative popularities for each of the players. The relative popularities can then be used by event organizers to determine the amount of air time to be given to each player in subsequent matches based upon the new relative popularities. The amount of air-time can also be adjusted in real-time based upon audience preferences determined by the analysis of the data transmitted from the image capture devices of the image-providers focus in real-time. Furthermore, information can be sent back to the image providers while they are watching a match, where the information can include the score of the match, background facts about the athletes, information about the court or event location, public service and security announcements, or advertisements for products being sold at the event or endorsed by the athletes.

Another example would be private gatherings, for example, of friends which may involve different restaurants or locations in an evening. The attendee can snap images during the event and the service and application by way of its tagging and linking can automatically create a collective piece for the attendees in remembrance of that gathering.

A similar example could involve a boat race such as the America's Cup Yacht race, where remote device user A assigns Event D including the real-time GPS location of the Yacht that manifests as text "X meters to the finish, brought to you by ESPN". User C views the America's Cup Yacht with a cell phone receiving Event D in real time.

The application or service may also make visible to one participant, an identifier or other identifying information of other attendees at that event such as to spur additional social interaction (e.g., by lookup on a separate or integrated social networking application).

A pull down menu or other interactive option can be generated using an application with which an individual can select one or more tags or identifiers for tagging images or media before, during, or after an image is taken. The option may also be automatically displayed as a pop-up with the option to use the tag and if desired, with an additional option to submit the image or media to the service provider, e.g., to be published.

Aspects of this technology provide the advantage of being able to collect and organize images or other media in connection with an event (e.g., one having a specified time window, one having a specified duration, one that is not indefinite in duration, one that is linked to the planned actions performed by individuals, etc.).

GPS or other location identification or tracking techniques can be implemented as part of the above methods or systems.

Software running on hardware such as computers, mobile devices, or servers can be implemented to provide the systems and methods illustratively described above. Computer readable medium (in one location or multiple locations, e.g., on mobile devices, servers, etc.) can be implemented on which can be recorded one or more executable applications including computer executable instructions that comprise one or more methods illustratively described herein and non-limiting variations contemplated herein.

An example of an embodiment of the invention involves multiple individuals present at an event where the observers are geographically distributed, for example along a street for a parade, a marathon, or throughout a neighborhood for an event like a block party or the Academy Awards. In such cases, each observer's active image capture device forms a line of sight from their GPS position along the device's compass heading that intersects with multiple other lines of sight from the other observers, thereby creating multiple points of intersection that can be interpreted as a part of a cluster formed by all the intersecting lines of sight from all the active image capture devices. In such a case, it is difficult to determine which of the multiple intersecting points along a first observer's line of sight constitute the actual object of focus. The server application receives the time, position and direction data from the multiple devices located over a wide geographic area, calculates the multiple points of intersection, and determines that a cluster exists due to the proximity of the intersecting points to each other, however additional filtering and analysis is required to determine what constitutes noise and artifacts of the calculations and what are actual objects of interest. By storing the data and following the lines of sight over a period of time, the server can determine which points of intersection are behaving in an expected manner and which points of intersection are shifting in an erratic manner or disappearing from the cluster entirely. The server application can use such later observations to determine which points were noise, and back calculate to identify those points of intersection that were formed and identified earlier in time as irrelevant and remove them from the statistical calculations for percentage of observers and relevance.

In another example, multiple observers with active image capture devices can be at an event such as a football game, where the majority of observers are located within the stands and focused on the field, but there are stragglers within the corridors of the stadium and outside in the parking lot. For most of the time the devices present inside the stadium will be focused on the different players present on the field and to a lesser extent on the players and coaches and cheerleaders on the sidelines. Image capture devices in the parking lot may appear to be scattered randomly throughout the area, as would be the points of intersection, so there would not be an area of high density. All of the image capture devices focused towards the field will form multiple points of intersection with the lines of sight from the other image capture devices. The server software can compile the data being transmitted from the multiple image capture devices and calculate the set of points of intersection. The set of points can be analyzed to identify the clusters around actual objects of interest based upon the density of the points localized in particular areas. These high density clusters can be used to identify the actual targets of focus. It is also known that certain players such as the quarterback, wide receivers and running backs will receive a lot more attention than a random lineman, so this information can also be used to assist in filtering out noise and identifying the actual objects of interest.

As illustrated in FIG. 1, many more lines intersect at the wide receiver headed downfield to catch a pass and at the running back and quarterback, but numerous other intersection occur over the field that are unrelated to any player or recognizable event. The intersections are much more highly packed around the actual object of interest than around the unintended intersections, so the server can differentiate between such artifacts by statistical analysis of the density of the clusters. Although, only a small number of observers and intersecting lines are shown in FIG. 1, a much greater number would be present at a real event, and a much more statistically relevant set of data would be produced by the lines of sight and calculated points of intersection to create a much higher cluster density and a much greater ratio of observers focused on actual objects of interest.

As the play develops the lines of sight and points of intersection will shift to follow the play, and the server will filter out the data received from the image capture devices and repeatedly perform the triangulation calculations for all the intersecting lines of sight. Non-relevant points can be determined and dropped from the calculations to free up server resources. In addition, other parties can receive the statistical information and use it to direct other aspects of the event, such as focusing TV cameras on the location showing the highest cluster density and displaying that particular image on the stadium wide-screen display for the entire audience to view. Likewise, the teams, sponsors, and advertisers can receive information regarding the relevant clusters and transmit information such as the player's name and statistics back to the image capture devices to be viewed by the observers, or particular advertisements can be transmitted to the observers devices. The advertisers may have previously bid on portions of advertising time related to the most popular players, or they may bid in real time based upon the amount of attention the player is currently receiving for the particular play.

In another example, the direction of focus for a small number of devices may suddenly shift from one point of focus to another location, such as from the field to the stands due to some new event or disturbance suddenly occurring. While the server may initially filter out the data stream from such devices because of the suddenly changing direction of focus, once the compass headings have again become relatively constant, the server will accept the GPS and directional data stream from those devices and perform the triangulation calculations to determine the new point of intersection. As more observers switch their attention and focus from the field to the stands, the server application will detect a sharp rise in cluster density for that location and determine that the shift represents a statistically relevant occurrence in the stands.

This occurrence of a new event at a location outside the expected area of interest can be used as a flag to transmit the information and images to another party, such as a security agency, to screen the information and investigate if necessary. If the images and metadata transmitted from the observers' devices describe a crisis such as a fight in the stands, a security detail can be immediately dispatched to the location corresponding to the cluster's location. The use of these dynamic clusters to identify different occurrences has the advantage of producing a much quicker response because observers in the immediate vicinity of the event will become aware of the incident and change their focus much more quickly, while a standard security agency would still be scanning the entire audience and stands trying to recognize such occurrences. Furthermore, as an event develops, the level of interest will propagate out from the immediate location to observers farther away. Such a propagating shift in focus can also be statistically analyzed to determine where the occurrence started, the rate at which the observers' attention shifts to the new occurrence, and the significance of the occurrence based on the size of the cluster generated.

As another example, individuals on a street may notice a building on fire. An number of observers activate their electronic devices to capture images of the event. The application program establishes a communication connection with the server system and begins transmitting UPS position and Compass direction data to the server in real time. Two observers focusing on the event creates intersecting lines of sight that forms a cluster. The server application receives the data and recognizes the formation of the cluster as a relevant event because there are only a limited number of active electronic devices at the location and a statistically relevant number of the active devices are focusing on the same object. In addition, the rate that additional observers join and create additional points of intersection also indicates the significance of the event. The occurrence of a new relevant event showing a large increase in a cluster that didn't previously exist can cause an alert to be communicated to another party, which can be an agency that can determine if it is a crisis and can respond as appropriate. The determination can be made based on the images being transmitted from the observers' image capture devices and the information tagged to the images by the observer(s) as metadata, such as "fire" or "robbery" at some location. The images and tag information can then be used to distinguish the event between such things as a fire, a robbery, a potential suicide, or the presence of a celebrity for example. The observers present at the event and creating the clusters can be notified by the server of each others' existence and given the option of forming a discussion or create an impromptu social network. The images communicated to the server with time, location, and direction data can also be posted online or communicated to others registered to receive such news feeds.

Example of some of the embodiments are further described in reference to the illustrative figures.

An example of a sporting event is illustrated in FIG. 1, where observers 101 are located both inside and outside a stadium 100. At various times during the game, observers 101 with remote electronic devices, such as smart phones, running a remote application are focused on different objects both on and off the field. Each of the remote electronic devices have specific GPS coordinates and are facing in a specific direction as determined for example by a compass heading. There attributes are unique for each electronic device, and can be communicated to a remote server as a continuous stream of data reflecting the real time position and facing of the devices. The server or server system receives the continuous data feeds from each of the remote electronic devices and can compile the data in a data base for subsequent calculations and analysis using various algorithms. The object being focused on by an observer 101 can be determined by calculating a line of sight 105 propagating away from the observer's device, and determining which lines of sight emanating from other remote devices intersect the observer's line of sight 105. The points of intersection 110 can be calculated through triangulation. In this manner, multiple points of intersection 110 can be identified as indicated by black circles in FIG. 1. Once the points of intersection 110 have been determined clusters 120 can be identified which points of intersection are closely packed together compared to individual points randomly scattered about. For example, four lines intersect what would be a wide receiver 150 moving down field creating a particular cluster, where as three lines intersect a running back 160 and two lines intersect the quarterback 170. An additional cluster of three intersecting lines occurs on the line of scrimmage 180, but that random arrangement of intersecting lines would be recognized to have a statistically lower density than the specific objects of interest. Identifying the most densely packed cluster that fall on the observer's line of sight would be considered to statistically be that observer's object of interest.

As players 140 moved about the field, the points of intersection 110 would shift with time as the play unfolds and different players engage in different actions. The system can follow both the movement of the players and the shifting of attention from one player or location to another by tracking the points of intersection and measuring the change in density of the clusters associated with the different player. For example, the audiences attention would suddenly shift from the quarterback 170 to a wide receiver 150 once a pass is thrown. This would be indicated by a large increase in the number of intersecting lines occurring at the location of the wide receiver 150, and would be recognized as a large increase in the density and therefore relevance of that cluster.

By analyzing the density of the clusters, other parties can follow the audiences point of focus and use that to direct their own actions, such as focusing television cameras on the same player at the same time, or displaying additional information to the observers focused on that player, such as his name and statistics. Advertisements could also be sent back to the observers electronic devices. For example, if the running back endorses a particular brand of shoe, observers focused on the running back could receive an advertisement for that shoe during the time they are focused on that player.

Figure 2:
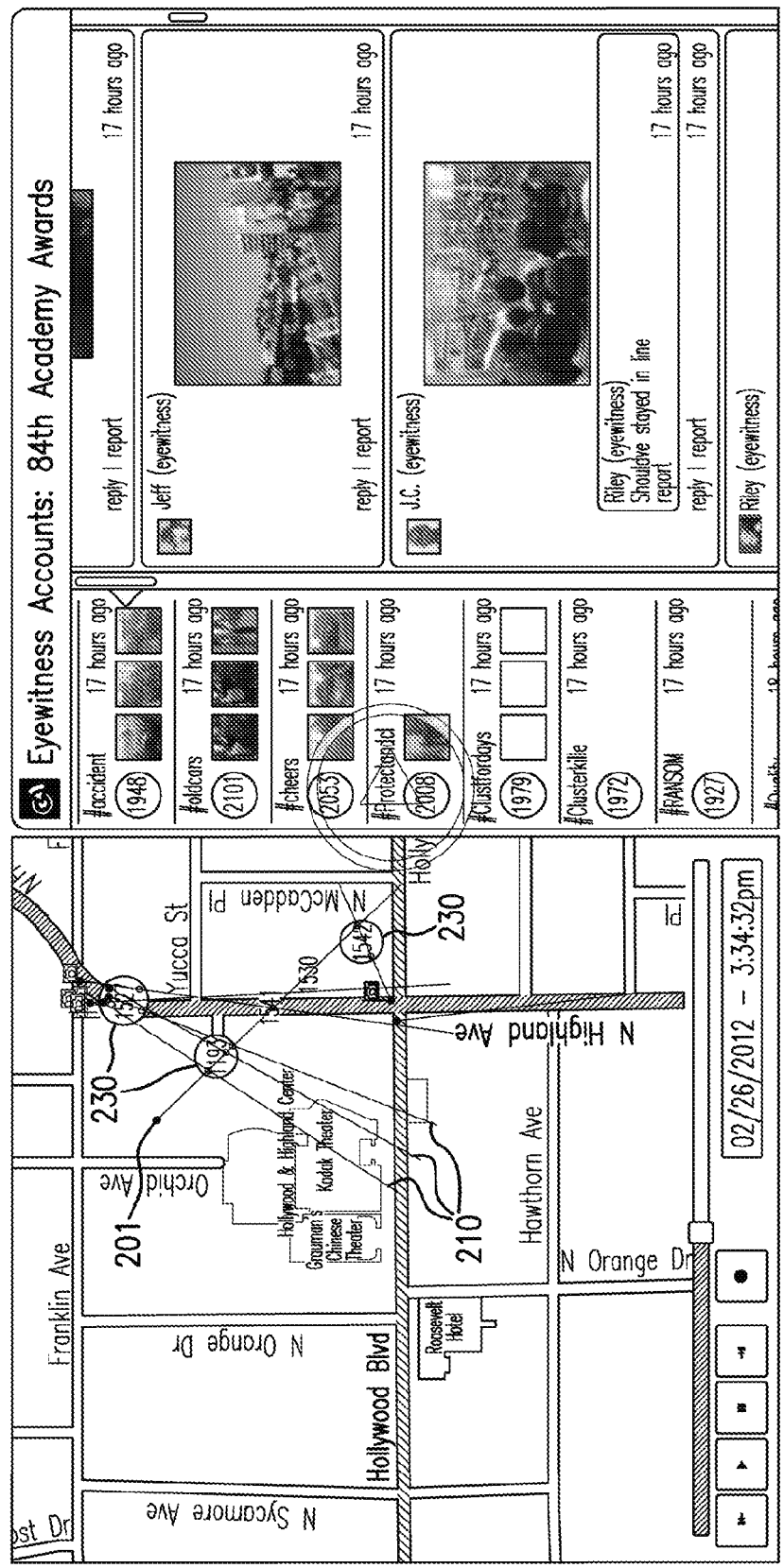
FIG. 2 is a diagram of a neighborhood holding an event such as for example the Academy Awards as would be viewed on a dashboard.

Another example of an outdoor event, such as the Academy Awards, is illustrated in FIG. 2. A number of observers 201 are situated along various street and focusing on other people 220, different clusters 230 are identified by the circles labeled 1527, 1193, 1541, 1530, and 1542. The clusters are generated by the intersecting lines 210 emanating from the different observers, where the density of the cluster is shown by the size of each circle and the number of point falling within each circle. The number of points per unit area would provide the density of the cluster and indicate the significance of each cluster compared to the others.

Figure 3:
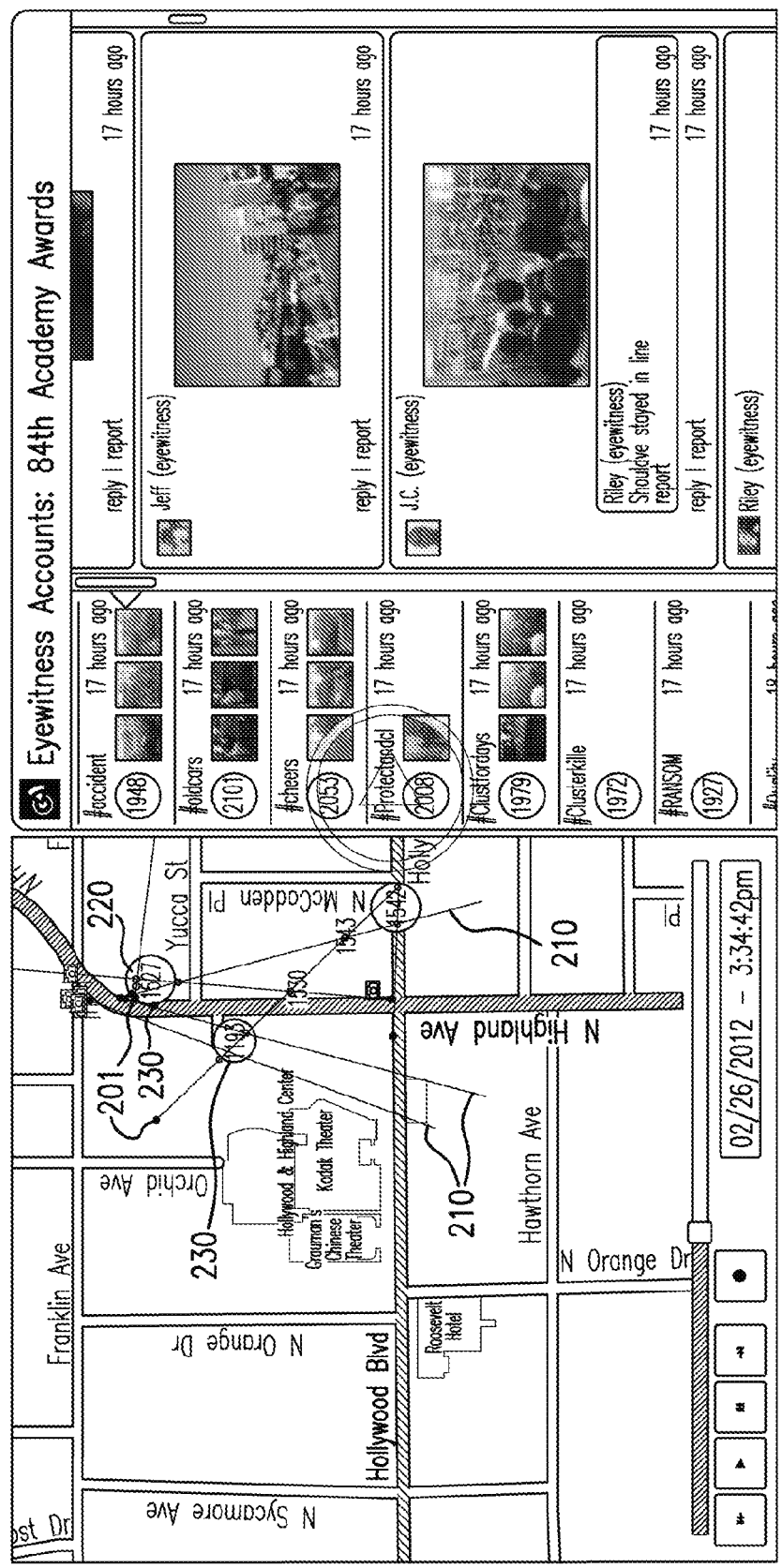
FIG. 3 is a diagram of a neighborhood holding an event such as for example the Academy Awards at a later time than that shown in FIG. 2.

FIG. 3 illustrates that same neighborhood later in time, thereby showing how both the people and the direction of focus has shifted. Each of the clusters 230 has changed location, size and density from that shown in FIG. 2. The change in size and density indicates the clusters change in significance.

Figure 4:
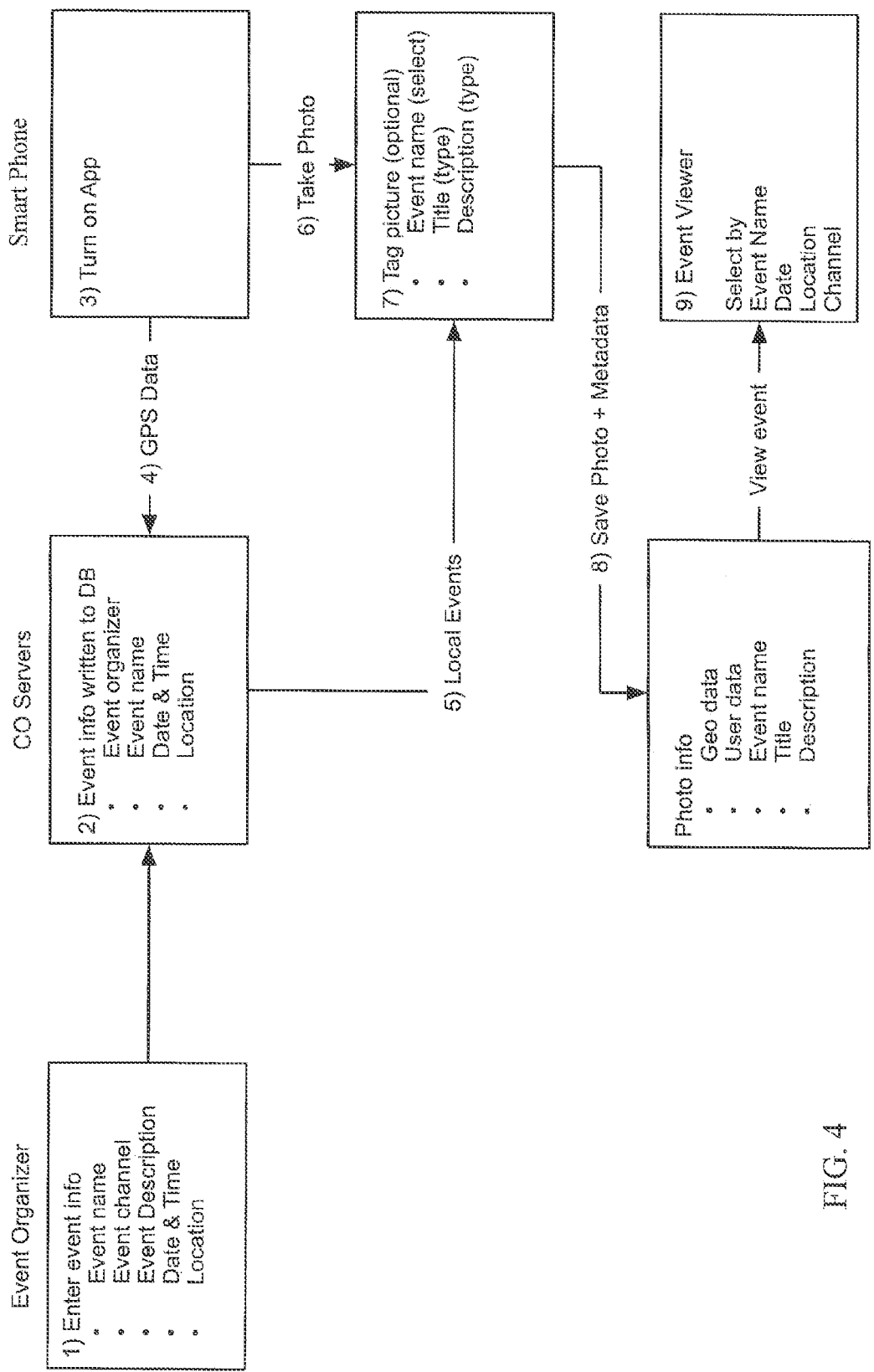
FIG. 4 is a flow chart depicting the steps in a preferred embodiment of the process of communication between remote devices and an organizer to obtain images or videos of an event.

FIG. 4 is a flow chart showing the process of defining the fields in a data base, communicating with a remote device, such as a smart phone, capture and communicate a digital image to sever server, and store the image in the database based upon the metadata tagged to the image.

Figure 5:
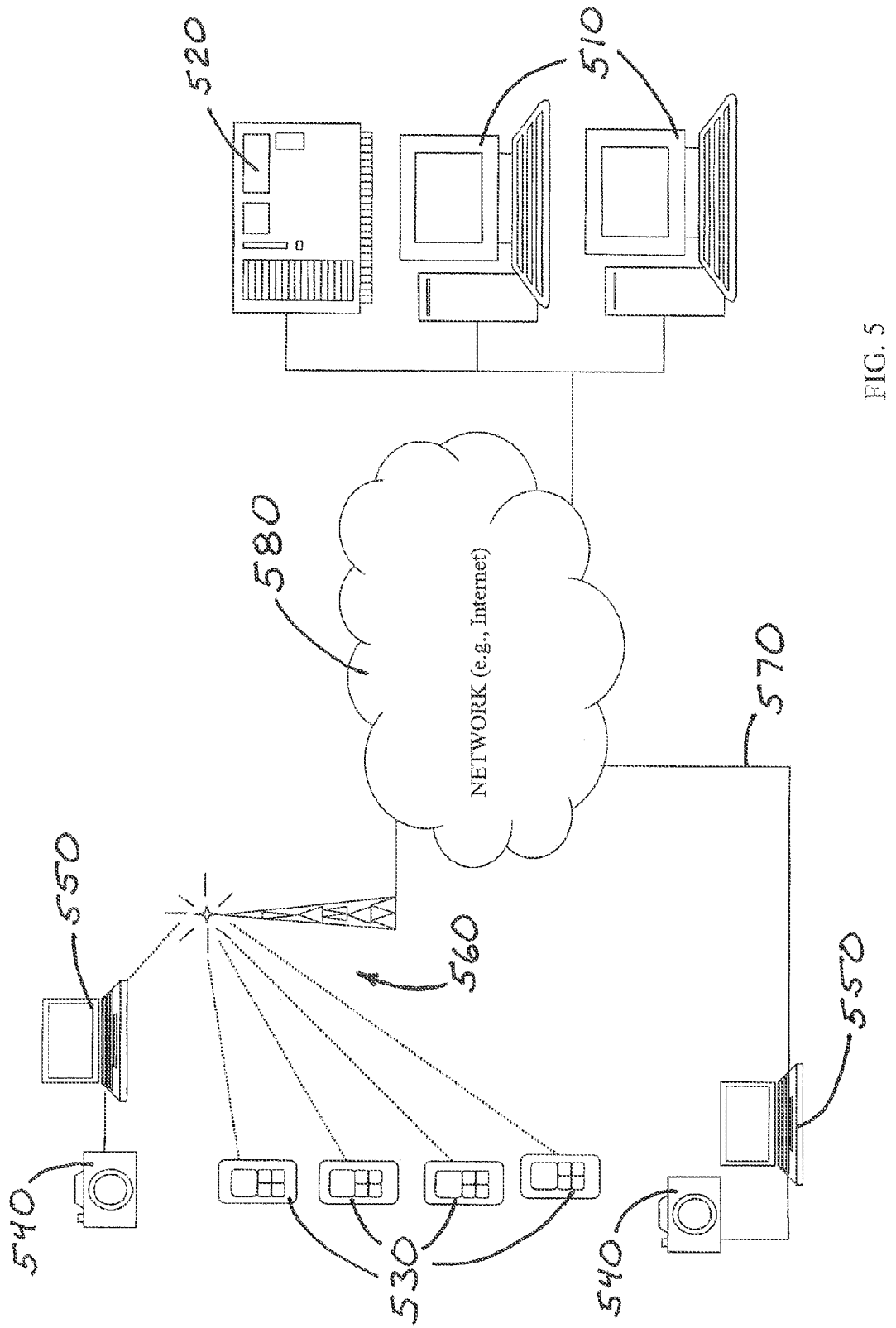
FIG. 5 is a diagram of an exemplary system involved in implementing an embodiment of the present invention.

FIG. 5 illustrates an example of a system involved, in implementing various embodiments of invention. The computer system comprises one or more computer(s), which can be desktop computers 510, or multi-processor computers and larger mainframe type computers 520, or a combination of such computer systems, depending upon the communication and, processing power necessary for receiving data and, performing the various calculations. The stream of data can be transmitted from one or more portable or mobile devices 530, for example smart phones, other image capture devices, such as digital cameras 540 and video-recorders, or laptop 550 and tablet computers having image capture hardware, which can communicate with other devices over a network. Digital cameras may be connected to a laptop computer to transmit information and images over a network to a computer system. The remote devices can communicate through a wireless communication system 560, such as a cellular network, or WiFi or WiMax. A device may also be connected to the computer system through wired network 570, such as cable, fiber optic, or PSTN, and all devices may also be interconnected through a computer network 580, for example the Internet.

The various remote devices can transmit their attributes comprising time data, directional data, and position data across the one or more communication networks to the computer system running at least an application program and a database program. Fixed devices, such as digital television cameras (not shown) may also be connected to the computer system through a network.

Figure 6:
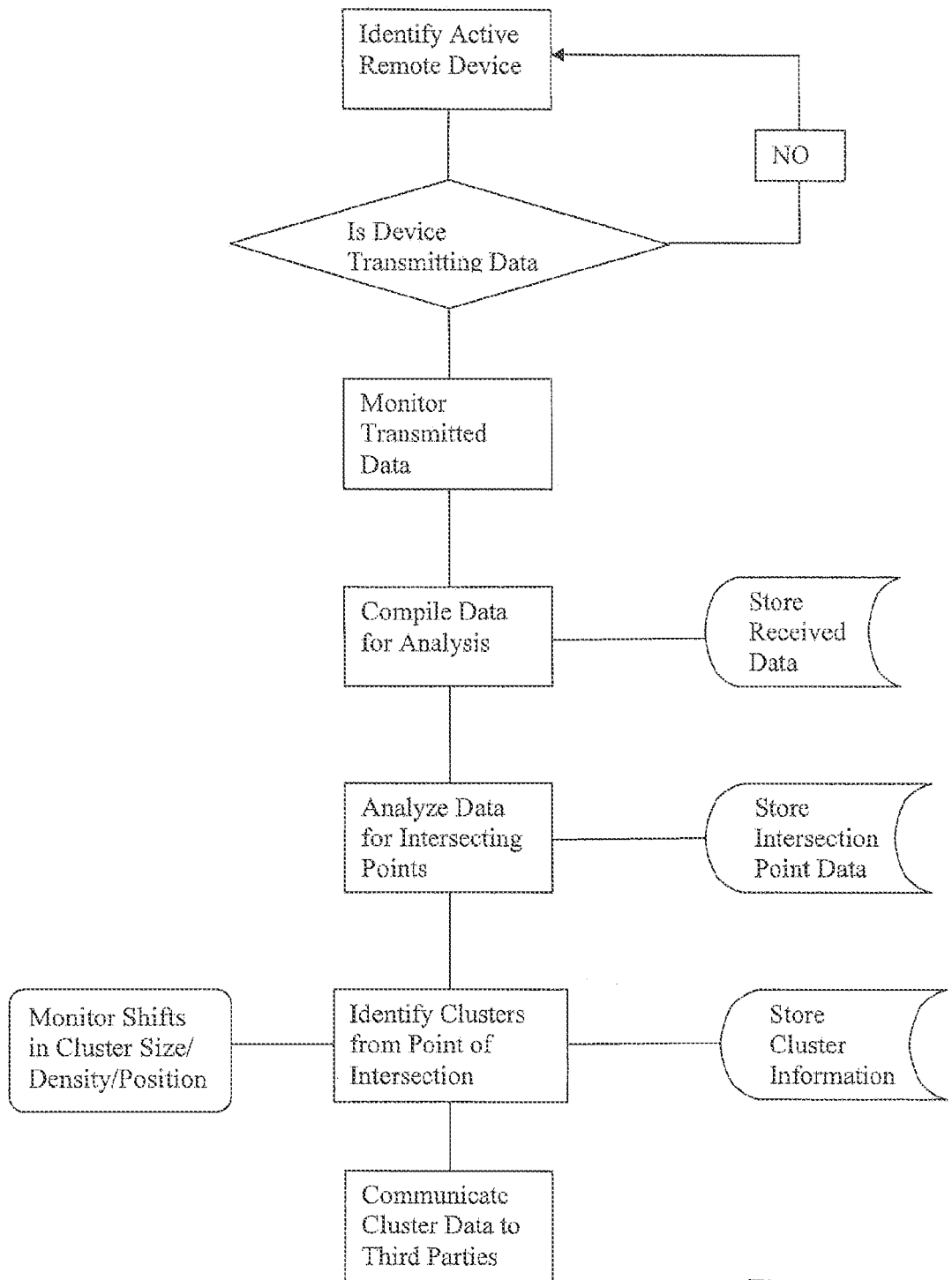
FIG. 6 is a flow chart of the general operation of an embodiment of the invention.

The general operation of an embodiment of the invention is shown in the flow chart of FIG. 6. The system identifies the one or more remote devices that are in communication with the computer system and determines whether the device is active (i.e., powered up and running the application) and transmitting data to the computer system. If the device is not transmitting data, for example if it was being used as a phone, the system checks to see if other active devices are transmitting data, if the computer system detects an incoming stream of data, the computer monitors the data stream to determine if the data is sufficiently consistent to use for calculations. If the transmitted data values are erratic, the data is filtered out. If the data is consistent, the data is compiled by the computer system and stored for analysis. The application program analyzes the received data to identify points where lines of sight intersect. The points of intersection are stored by the computer for further analysis. The application program analyzes the points of intersection to identify clusters that would indicate objects of interest located where there are higher densities of points compared to the background. The information on the cluster(s) are stored on the computer system, where the information can include the cluster's location, density, what kind of occurrence or type of actual object the cluster represents, the ratio of intersecting points forming the cluster compared to the total number of intersecting points, a time stamp, etc, and is used to taw, and identify the cluster. Since the clusters change over time as occurrences end and new events begin, or the objects of interest move about, or the level of interest in the object or occurrence changes, these changes can also be stored and monitored. The information tagging the cluster can be communicated to other parties that would be interested in the data. The parties could be parties that are tasked to monitor the formation and shifting of clusters, such as security or news agencies, or would make decisions based upon the information, such as broadcasters and advertisers.

Figure 7:
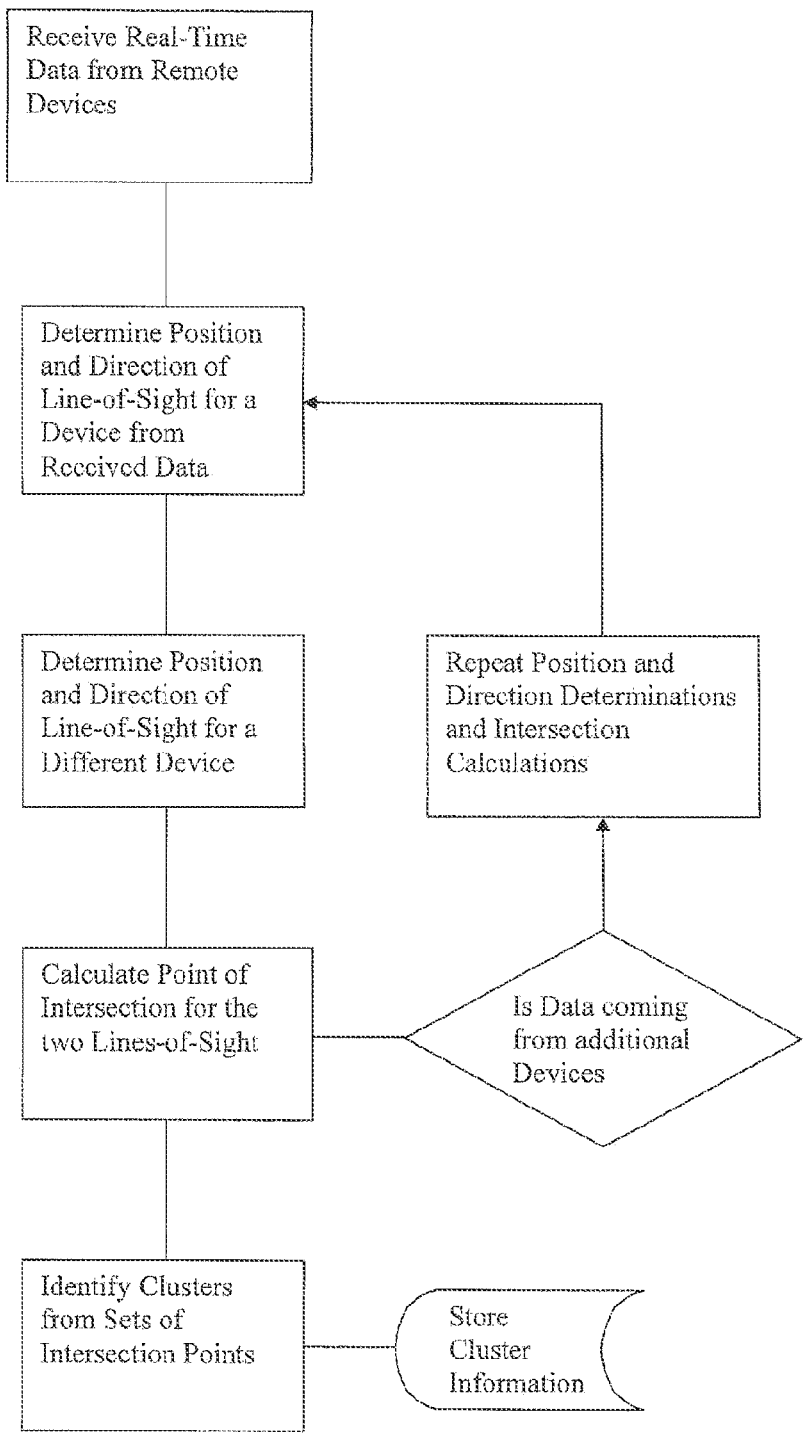
FIG. 7 is a flow chart that illustrates an example of the steps executed to triangulate on an object of interest and form a cluster.

FIG. 7 illustrates an example of the steps executed to triangulate on an object of interest and form a cluster. The system receives data from a remote device in real time and analyzes the data to determine the position and direction of a line-of-sight for the device. The data could include GPS coordinates and Compass heading for the device. The system determines the position and direction of line of sight for anther remote device. Once the system has two positions and two lines of sight, the system can determine the angles between the lines of sight and calculate the point of intersection for the two lines of sight. The system can determine if there are additional devices with a line of sight that would intersect one of the previous lines of sight. The system repeats the calculation for each pair of devices to determine where the lines of sight intersect to form a set of points. The multiple points of intersection are analyzed to identify one or more clusters, and the information relating to the cluster(s) is stored by the system.

Figure 8:
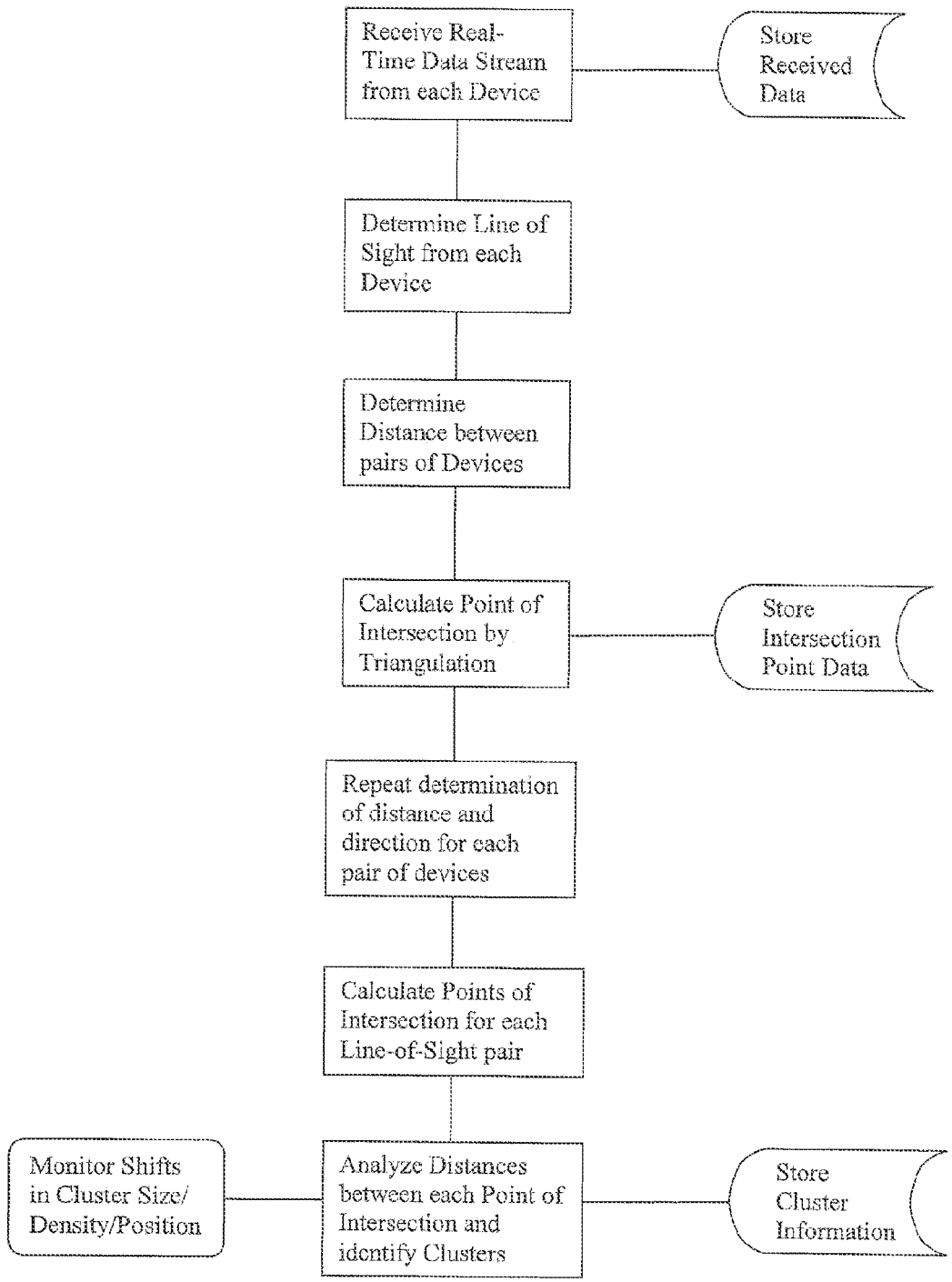
FIG. 8 is a flow chart that illustrates an example of the steps for an embodiment of a method of the invention.

FIG. 8 illustrates the steps of another embodiment of a method of the invention.

Figure 9:
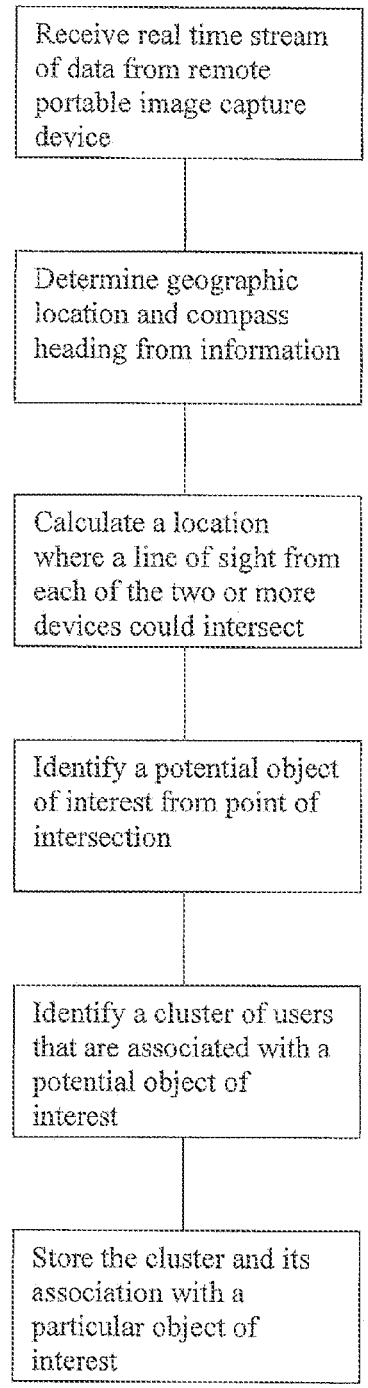
FIG. 9 is a flow chart that illustrates an example of the steps for another embodiment of a method of the invention.

FIG. 9 illustrates the steps of another embodiment of a method of the invention, where the system receives the real time data stream, determines the location and compass heading from the data, calculate the intersections of the lines of sight, identify objects of interest from the points of intersection as described throughout the application, identify clusters of users associated with an object of interest, and store the cluster and association with a particular object of interest.

Figure 10:
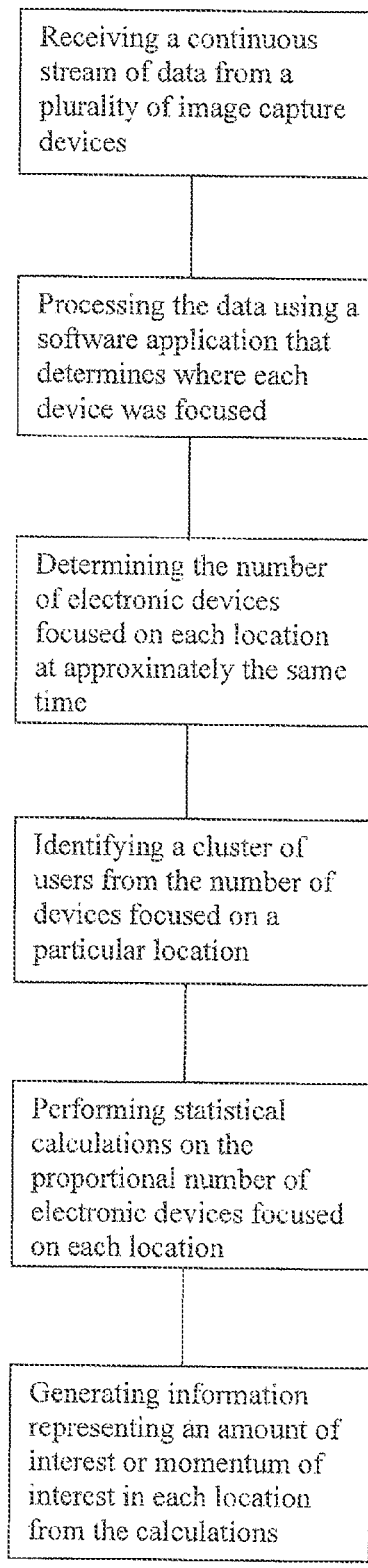
FIG. 10 is a flow chart that illustrates an example of the steps for determining the amount of interest and momentum in a location or object.

FIG. 10 illustrates an example of the steps for determining the amount of interest and momentum in a location or object.

Figure 11:
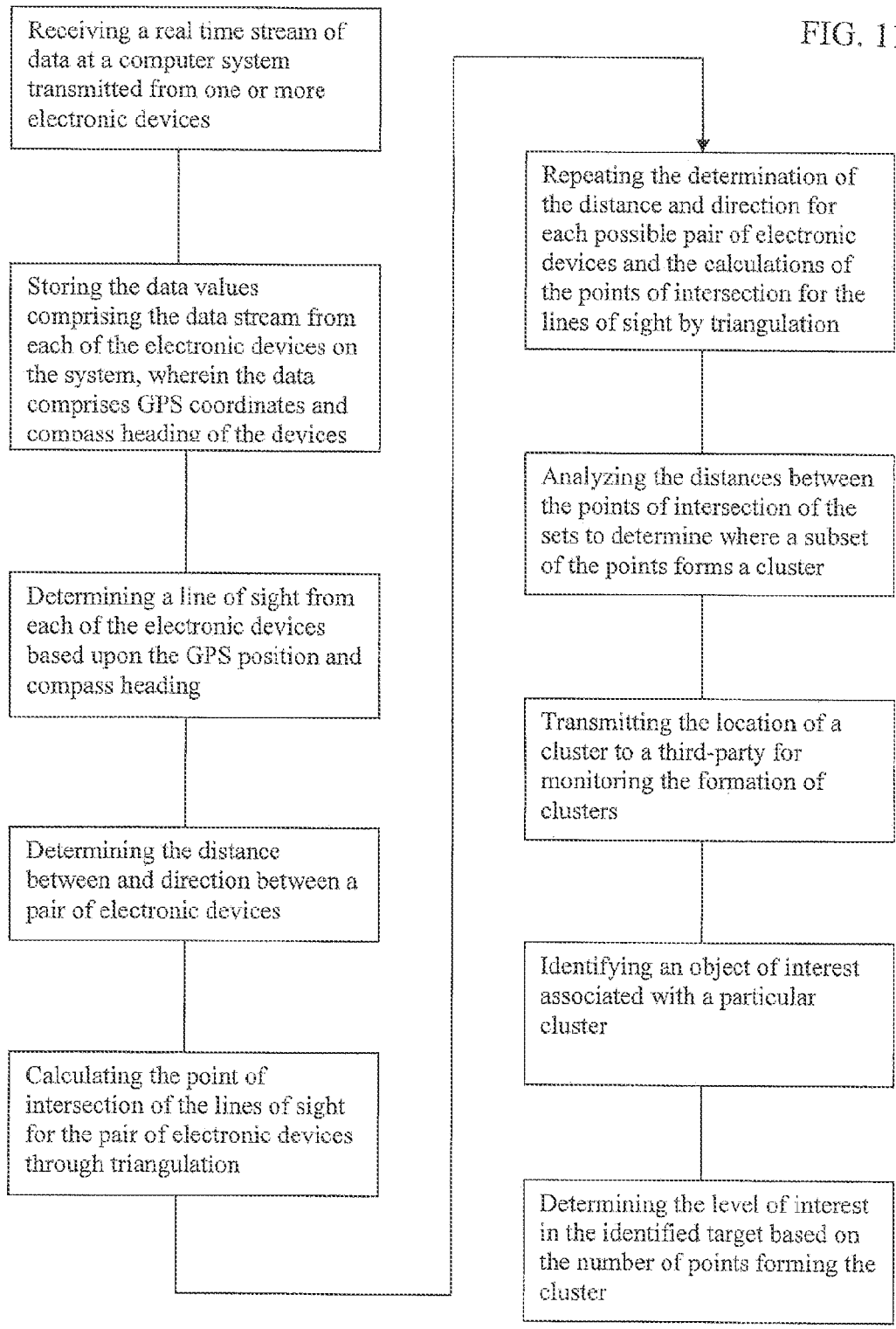
FIG. 11 is a flow chart that illustrates another method for triangulating and determining the amount of interest and momentum in a location or object.

FIG. 11 illustrates the another method for triangulation and performing the analysis for determining the amount of interest and momentum in a location or object.

Figure 12:
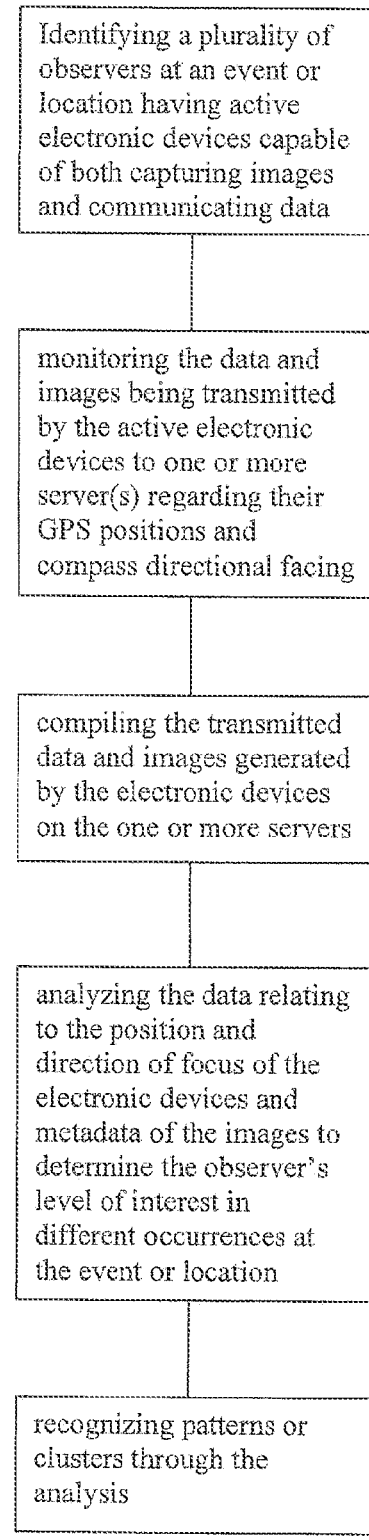
FIG. 12 is a flow chart that illustrates an example of the steps of a method for recognizing patterns or clusters.

FIG. 12 illustrates the steps of a method for recognizing patterns or clusters.

Although this present invention has been described in considerable detail with reference to certain preferred versions thereof, other embodiments are possible. Therefore, the spirit and scope of the invention should not be limited to the description of the preferred embodiments contained herein. In addition, the examples provided each describe a particular number of steps, however, more or less steps and variations of the above described order are also contemplated, and should be considered within the principles and scope of the invention.

It should be understood by those of ordinary skill in the art of computers and telecommunications that the communications illustratively described herein typically include forming messages, packets, or other electronic signals that carry data, commands, or signals, to recipients for storage, processing, and interaction. It should also be understood that such information is received and stored, such as in a database, using electronic fields and data stored in those fields.

It is to be understood that some or all of the above described features, components and method steps can be combined in different ways, and other variations and modifications other than those illustrated will be apparent to persons of ordinary skill in the art. In particular, the various embodiments of the present invention may be implemented with other choices of hardware, and software distributed over the different hardware components or within a computing cloud, as well as the storage and processing of the data, according to the embodiments and criteria stated above.

Those of skill would further appreciate that the various illustrative logical blocks, modules, circuits, and algorithm steps described in connection with the embodiments disclosed herein may be implemented as electronic hardware, computer software, or combinations of both.

The various illustrative logical blocks, modules, processes and functions described in connection with the embodiments disclosed herein may be implemented or performed with a general purpose processor (e.g., such as one in a computer or server), or with some other type of processor.

In one or more exemplary embodiments, the functions described may be implemented in hardware, software, firmware, or any combination thereof. If implemented in software, the functions may be stored on or transmitted over as one or more instructions or code on a computer-readable medium such as non-transitory computer readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, DSL, or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes Compact Disc (CD), laser disc, optical disc, Digital Versatile Disc (DVD), floppy disk and blu-ray disc where disks usually reproduce data magnetically, while discs reproduce data optically with lasers. Combinations of the above should also be included within the scope of computer-readable media.

Each and every one of these permutations and combinations is separately deemed to be an embodiment herein in its own right, and engineering requirements and/or governing code appropriate for transmission and communication between the components, as well as the implementation of the application(s), will govern the use and deployment of the said embodiments and establish separate embodiments herein such that each and every one is its own embodiment, it is therefore intended that all of these embodiments, examples, variations and modifications thereon are meant to be encompassed within the spirit and scope of the present invention as set forth in the following claims.

What is claimed is:

1. A computer implemented method of determining the shifting level of interest in an object at an event or location, which comprises:

identifying in a computer system, a particular object of interest at an event or location;

receiving a real time stream of data at the computer system relating to the object of interest, which data are transmitted from one or more electronic devices present at the particular event, wherein the electronic devices are remote from the computer system;

storing the data values comprising the data stream from each of the electronic devices on the computer system, wherein the data values comprise at least the GPS coordinates and the compass heading of the transmitting electronic device;

determining a line of sight from each of the electronic devices based upon the GPS position and compass heading;

determining the distance and direction between a pair of electronic devices;

calculating the point of intersection of the lines of sight for the pair of electronic devices through triangulation;

repeating the determination of the distance and direction for each possible pair of electronic devices at the event and the calculations of the points of intersection for the lines of sight of each possible pair of electronic devices through triangulation to create a set of such points;

analyzing the distance between the points of intersection of the set to determine where a subset of the points forms one or more intersection cluster(s), wherein the intersection cluster is a subset of points located within a predetermined distance from all the other points, and each intersection cluster is associated with a particular object of interest;

tracking the change in the points of intersection over time to determine changes in the position and size of the intersection cluster(s), wherein changes in the number of points forming the intersection cluster identifies shifting levels of interest between particular objects of interest; and transmitting the location of a cluster to a third-party for monitoring of the formation of such clusters at the event.

2. The method of claim 1, which further comprises:

repeating the analysis of the set of points to identify all subsets forming clusters at a particular time;

identifying an object of interest associated with a particular cluster; and determining the level of interest in the identified object based on the proportion of the number of points in the subset forming the particular associated cluster compared to the total number of intersection points forming the set.

3. The method of claim 2, wherein the third-party is a broadcaster, and the broadcaster receives the location and level of interest in one or more objects of interest to assist in determining which object to focus on for broadcasting in real time to a viewing audience.

4. The method of claim 3, wherein the third-party is a security agency, and the particular location and rate of the shifting level of interest in an object indicates a possible security risk at the location to alert the security agency of such risk.

5. The method of claim 1, which further comprises:

associating a cluster with the data used to calculate the subset of points forming the cluster;

identifying the electronic devices that transmitted the data associated with the cluster; and transmitting a message back to the identified electronic devices.

6. The method of claim 5, wherein the message transmitted to the identified electronic devices is an invitation to form a discussion group between the electronic devices.

7. The method of claim 5, wherein the message transmitted to the identified electronic devices comprises information about the object of interest.

8. The method of claim 5, wherein the message transmitted to the identified electronic devices is an advertisement for a product or service.

9. The method of claim 3, which further comprises filtering the stream of data received by the server to eliminate erratic data values before server resources use the erratic data to calculate lines of sight and points of intersection.

* * * * *